US007623532B2

(12) United States Patent
Liva et al.

(10) Patent No.: US 7,623,532 B2
(45) Date of Patent: *Nov. 24, 2009

(54) ENHANCED FIBER NODES WITH CMTS CAPABILITY

(75) Inventors: Valentino Liva, Los Altos, CA (US);
Alok Sharma, San Jose, CA (US);
Lance Smith, San Jose, CA (US); James Yee, Union City, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 398 days.

This patent is subject to a terminal disclaimer.

(21) Appl. No.: 11/553,882

(22) Filed: Oct. 27, 2006

(65) Prior Publication Data

US 2007/0050835 A1 Mar. 1, 2007

Related U.S. Application Data

(63) Continuation of application No. 10/033,378, filed on Oct. 24, 2001, now Pat. No. 7,149,223, which is a continuation-in-part of application No. 09/715,992, filed on Nov. 16, 2000, now Pat. No. 6,993,016, and a continuation-in-part of application No. 09/800,397, filed on Mar. 5, 2001.

(60) Provisional application No. 60/187,194, filed on Mar. 6, 2000.

(51) Int. Cl.
*H04L 12/56* (2006.01)
*H04N 7/00* (2006.01)

(52) U.S. Cl. .................. 370/401; 370/486; 725/127; 725/148

(58) Field of Classification Search .................. None
See application file for complete search history.

(56) References Cited

U.S. PATENT DOCUMENTS 4,953,184 A 8/1990 Simone (Continued)

OTHER PUBLICATIONS

Fabien Buda; U.S. Appl. No. 09/974,030; entitled Multiple Input Multiple Output Channel, Digital Receiver Tuner; filed Oct. 10, 2001; 39 pages.

(Continued)

*Primary Examiner*—Hong Cho
*Assistant Examiner*—Robert C Scheibel
(74) *Attorney, Agent, or Firm*—Harrity & Harrity, LLP

(57) ABSTRACT

Enhanced Cable Modem Termination System (CMTS) functionality, including programmable digital domain modulators and demodulators for dynamic channel assignment, is incorporated into Fiber Nodes (FNs) or mini Fiber Nodes (mFNs), yielding enhanced Fiber Nodes (eFNs). These eFns distribute CMTS functionality deep into Hybrid-Fiber-Coax Networks (HFCN) rather than centralizing the CMTS functions within a single location. Moving the cable modem terminations closer to the subscribers shortens the analog RF paths required to support cable modems. Communication of both subscriber data and CMTS control data is performed over Ethernet-compatible packet networks between the field-based CMTSs and an upstream facility (e.g., the Head End), which includes an Internet gateway. Packet data for multiple subscriber cable modems is easily compressed and merged over common network paths, reducing cabling plant complexity and increasing bandwidth utilization. This approach dramatically reduces the infrastructure cost per cable modem. Distributing CMTS functionality among multiple eFNs also reduces demands on already stretched resources at the Head End for space, power, and HVAC. For HFCN channels containing signals with modulation or encoding schemes that are unknown or best processed upstream, the invention also provides for tunneling their spectrum over the same packet network as used for the cable modem data. The channels to he tunneled are isolated using digital receivers, translated to baseband, their data framed, merged with cable modem subscriber data, and transmitted over the packet network. Upstream, the framed channel data is parsed and the original channel spectrum reconstructed to permit information recovery.

32 Claims, 23 Drawing Sheets

U.S. PATENT DOCUMENTS

| | | | |
|---|---|---|---|
| 5,361,091 | A | 11/1994 | Hoarty et al. |
| 5,489,879 | A | 2/1996 | English |
| 5,528,582 | A | 6/1996 | Bodeep et al. |
| 5,533,023 | A | 7/1996 | Ohlson et al. |
| 5,590,156 | A | 12/1996 | Carney |
| 5,654,765 | A | 8/1997 | Kim |
| 5,768,682 | A | 6/1998 | Peyrovian |
| 5,841,468 | A | 11/1998 | Wright |
| 5,878,325 | A | 3/1999 | Dail |
| 5,903,550 | A | 5/1999 | Spock |
| 5,930,231 | A | 7/1999 | Miller et al. |
| 5,943,604 | A | 8/1999 | Chen et al. |
| 6,021,158 | A | 2/2000 | Schurr et al. |
| 6,075,787 | A | 6/2000 | Bobeck et al. |
| 6,088,399 | A | 7/2000 | Luz et al. |
| 6,147,713 | A | 11/2000 | Robbins et al. |
| 6,160,572 | A | 12/2000 | Matsuura |
| 6,233,235 | B1 | 5/2001 | Burke et al. |
| 6,236,678 | B1 | 5/2001 | Horton, Jr. et al. |
| 6,263,195 | B1 | 7/2001 | Niu et al. |
| 6,282,184 | B1 | 8/2001 | Lehman et al. |
| 6,356,374 | B1 | 3/2002 | Farhan |
| 6,385,773 | B1 * | 5/2002 | Schwartzman et al. ...... 725/124 |
| 6,427,157 | B1 | 7/2002 | Webb |
| 6,449,071 | B1 | 9/2002 | Farhan et al. |
| 6,452,424 | B1 | 9/2002 | Shamlou et al. |
| 6,466,913 | B1 | 10/2002 | Yasuda et al. |
| 6,490,727 | B1 * | 12/2002 | Nazarathy et al. ........... 725/129 |
| 6,519,773 | B1 | 2/2003 | Ahmed et al. |
| 6,544,046 | B1 | 4/2003 | Hahn et al. |
| 6,574,797 | B1 * | 6/2003 | Naegeli et al. .............. 725/120 |
| 6,594,305 | B1 | 7/2003 | Roeck et al. |
| 6,608,837 | B1 | 8/2003 | Brodigan |
| 6,650,624 | B1 | 11/2003 | Quigley et al. |
| 6,721,371 | B1 | 4/2004 | Barham et al. |
| 6,751,230 | B1 | 6/2004 | Vogel et al. |
| 6,768,722 | B1 | 7/2004 | Katseff et al. |
| 6,778,525 | B1 | 8/2004 | Baum et al. |
| 6,785,292 | B1 | 8/2004 | Vogel |
| 6,826,195 | B1 | 11/2004 | Nikolich et al. |
| 6,839,413 | B1 * | 1/2005 | Brock et al. ............. 379/93.08 |
| 6,973,668 | B1 * | 12/2005 | Chen et al. ................... 725/111 |
| 6,980,592 | B1 | 12/2005 | Rambaud et al. |
| 6,993,016 | B1 | 1/2006 | Liva et al. |
| 7,099,340 | B2 | 8/2006 | Liva et al. |
| 2002/0012232 | A1 | 1/2002 | Creason et al. |
| 2002/0118739 | A1 | 8/2002 | Schier et al. |
| 2004/0213358 | A1 | 10/2004 | Patel et al. |
| 2005/0097617 | A1 | 5/2005 | Currivan et al. |

OTHER PUBLICATIONS

Alok Sharma, U.S. Appl. No. 09/800,397, filed Mar. 5, 2001, entitled "Transceiver Channel Bank with Reduced Connector Density ",45 pages.

Data-Over-Cable Service Interface Specifications: Radio Frequency Interface Specification, SP-RFIv1.1-I03-991105, 1999 Cable Television Laboratories, Inc., 382 pages.

US International Search Authority, International Search Report, PCT/US01/45799, mailed May 3, 2002, Washington, D.C. 20231.

Liva et al, U.S. Appl. No. 10/033,378; entitled Enhanced Fiber Nodes With CMTS Capability; filed Oct. 24, 2001; 73 pages.

PICMG; CompactPCI; http://www.picmg.org/compactpci.stm; 3 pages.

Kontron; cPCI-DT64; http://www.kontron.com; Technical Reference Manual; Version 1.4; Aug. 2004, 2 pages.

Notification of Transmittal of the International Search Report or the Declaration corresponding to PCT/US01/47632, Apr. 12, 2002, 5 pages.

* cited by examiner

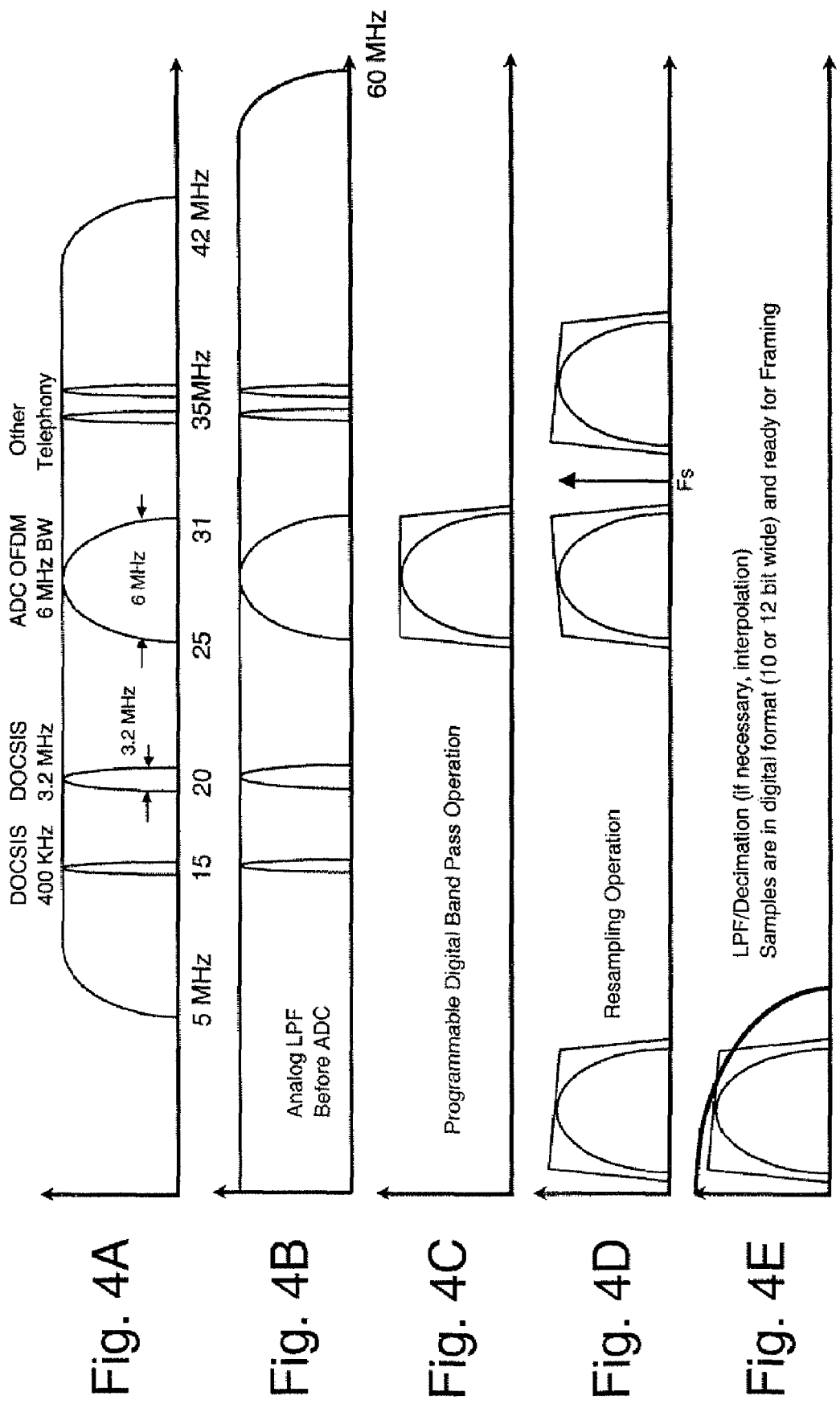

ENHANCED FIBER NODES WITH CMTS CAPABILITY

CROSS REFERENCE TO RELATED APPLICATIONS

This application is a continuation of U.S. patent application Ser. No. 10/033,378 filed Oct. 24, 2001, now U.S. Pat. No. 7,149,223 issued on Dec. 12, 2006, which is a Continuation-in-Part of the following patent applications:

U.S. patent application Ser. No. 09/715,992, entitled "METHODS AND APPARATUS FOR TRANSMISSION OF ANALOG CHANNELS OVER DIGITAL PACKET-BASED NETWORKS," Liva et al., filed Nov. 16, 2000 now U.S. Pat. No. 6,993,016 issued on Jan. 31, 2006; and U.S. patent application Ser. No. 09/800,397, entitled "TRANSCEIVER CHANNEL BANK WITH REDUCED CONNECTOR DENSITY," Alok Sharma, filed Mar. 5, 2001, which in turn claims priority to U.S. Provisional Patent Application Ser. No. 60/187,194, entitled "FREQUENCY AGILE DIGITAL TRANSCEIVER BANKS HAVING NON-UNIFORM CHANNEL WIDTH AND REDUCED CONNECTOR DENSITY," Alok Sharma, filed Mar. 6, 2000. The disclosures of all of the above-mentioned applications are incorporated herein by reference.

U.S. patent application Ser. No. 10/033,383, now U.S. Pat. No. 7,099,340 issued Aug. 29, 2006, entitled "ENHANCED CMTS FOR RELIABILITY, AVAILABILITY, AND SERVICEABILITY," Liva et al., filed Oct. 24, 2001; and U.S. patent application Ser. No. 09/974,030, now U.S. Pat. No. 7,142,620 issued Nov. 28, 2006, entitled "MULTIPLE INPUT, MULTIPLE OUTPUT CHANNEL, DIGITAL RECEIVER TUNER," Fabien Buda, filed Oct. 10, 2001.

BACKGROUND

In traditional Hybrid Fiber-Coax (HFC) systems for Cable Television systems, Fiber Nodes (FN) are intermediate subsystems in an overall information distribution network hierarchy. From least to highest bandwidth concentration, the network hierarchy includes subscribers (generally homes), FNs, secondary hubs (SHs), primary hubs, and the headend.

FNs interface with the SHs optically and interface with the subscribers over active RF coaxial networks (i.e., networks of coaxial cable interspersed with active RF distribution amplifiers as required for signal integrity). FNs may serve between 600 and 1200 subscribers. This can be accomplished by segmenting the total number of subscribers into "buses" of 300 subscribers. A cascade of five to eight RF amplifiers may exist between the FN and any given subscriber. Four to six fibers may couple the FN to a SH.

FIGS. 1A through 1C illustrate a prior-art HFC cable system having return channels wherein the primary processing is performed at the cable Head End. These return channels can include DOCSIS signals from cable modems and so-called legacy signals, which include conventional analog telephone signals and RF modulated digital signals with proprietary encoding schemes that remain encoded until receipt at the head end. FIG. 1A is a top-level view of the cable system, including the cable system head-end and the customer premises equipment (CPE). FIG. 1B provides additional detail of the CPE of FIG. 1A. FIG. 1C provides additional detail of the NID of FIG. 1B.

Recent variants to the above HFC architecture have been based on so-called mini fiber nodes (mFNs), a FN variant that is both smaller and deeper into the network (closer to the subscriber) than a traditional FN. FIG. 2A illustrates an HFCN incorporating such mFNs in conjunction with mFNs. The in FNs are generally distinguished from FNs in that they interface with only 50 to 100 subscribers and the path from mFN to subscriber is via an all passive coaxial network. The mFN distributes downstream information to the subscribers and aggregates upstream information from subscribers. The mFN interfaces via optical fiber to the next higher level in the hierarchy.

There are many possible topologies for mFN-based HFC systems and the exact functionality of an mFN will vary with the system topology. In a first example, MFNs can be used as part of a fiber overlay to upgrade traditional "trunk-and-branch" coaxial systems, or HFC systems with downstream only FNs, with return path (upstream) services (e.g., for Cable Modems). In such applications, the optical return (upstream) path is routed from the mFN directly to the SH, bypassing the downstream only path (which in an HFC system includes FNs). This in effect configures each line extender with a return fiber that provides each passive span with a unique return spectrum. FIGS. 2A and 2B illustrate such a prior-art HFC cable system having a packet fiber overlay using mini-FiberNodes (mFNs). FIG. 2A is a top-level view of the HFC/mFN cable system. FIG. 2B provides additional detail of the mFNs of FIG. 2A. In a second example, mFNs can be used with "MuxNodes" that replace a single FN or consolidate multiple FNs. MuxNodes not only "distribute" (demultiplex) information downstream but also "aggregate" (multiplex) information upstream (from subscriber to provider).

In either architecture—using FNs or mFNs, or a combination of the two—the bandwidth of the upstream path from an FN or mFN has previously been inefficiently utilized. The FN or mFN has heretofore re-transmitted the entire 5-42 MHz return spectrum to upstream hubs, though in most cases only a small portion of that spectrum is actually desired or will be utilized. The entire spectrum has been transmitted upstream because the bulk, cost and power consumption of the equipment required to process the upstream signal and pass on only the desired components has prohibited its deployment in the field.

In previous systems every upstream channel has required a respective splitter tap, receiver input including a bulkhead-mount connector, and cabling between the splitter tap and the receiver input. Such components, especially the high number of connectors, add cost and bulk that would otherwise not be expended, as well as introducing new noise. Additionally, previous systems have required manual adjustments or manual changing of plug-in components, in order to provision or reprovision a channel.

The aforementioned manual configurations of cabling and channel adjustments have been necessary at initial installation and often many times thereafter. Node recombining (e.g., manual recabling to pair a new logical channel with a new line card) has often been necessary whenever an existing subscriber channel reaches capacity and additional channels need to be assigned. Manual channel reprovisioning has also been frequently necessary to avoid various sources of ingress noise, which varies both in time and channels affected.

What is needed is an ability to efficiently process upstream signals in a cost- and space-effective way that can be done close to the subscriber, that reduces hardware introduced noise and minimizes the need for manual intervention when reprovisioning a channel.

A general discussion of HFC architectures, with a particular focus on mFN-based systems, is provided by the article "HFC architecture in the making: Future-proofing the network," by Oleh Sniezko, et al, in the July 1999 issue of Communications Engineering & Design Magazine (CED Magazine), published by Cahners Business Information, a member of the Reed Elsevier plc group.

"DOCSIS" is a family of interoperability certification standards for cable modems. "OpenCable" is a family of interoperability specifications directly and indirectly related to digital set-top box hardware and software interfaces. "PacketCable" is a family of specifications aimed at facilitating real-time, multimedia packet-based services, using a DOCSIS-managed regional access network as the foundation. While having broad applicability, an initial focus of PacketCable is VoIP (Voice over Internet Protocol). Cable Television Laboratories, Inc. (CableLabs), with offices in Louisville, Colo., is a research and development consortium of North and South American cable television operators. CableLabs manages, publishes, and distributes a number of specifications and certification standards related to various aspects of Cable Television systems, including the DOCSIS, OpenCable, and PacketCable standards families.

The International Telecommunications Union (ITU), headquartered in Geneva, Switzerland, is "an international organization within which governments and the private sector coordinate global telecom networks and services." The ITU manages, publishes, and distributes a number of international telecom related standards. Standards relevant to Cable Television systems include the ITU-T Series H Recommendations and the ITU-T Series J Recommendations The "-T" stands for Telecommunications. Series H covers all ITU-T standards for "audiovisual and multimedia systems." Series J covers all ITU-T standards for "transmission of television, sound programme and other multimedia signals."

SUMMARY

An enhanced CMTS, or "mini-CMTS," as taught herein, includes programmable digital domain modulators and demodulators that permit dynamic channel assignment. These DOCSIS-compliant CMTSs are characterized by high functional density, a compact form factor, low power consumption, and integral support for the merging of analog and digital channels for transmission over digital packet networks.

The digital demodulator section of the enhanced CMTS digitizes the entire return spectrum on each of multiple upstream inputs, each of which may include multiple upstream channels with no particular interrelationship. The digitized result is then bussed to the inputs of multiple all-digital receivers. Each receiver demodulator channel may be remotely, automatically, dynamically and economically configured for a particular cable, carrier frequency and signaling baud-rate, from an option universe that includes a plurality of input cables, a plurality of carrier frequencies, and a plurality of available baud-rates.

Implementing all processing of each upstream channel in digital circuitry, including any baseband translation and filtering for channel selection, minimizes the number of required A/Ds, number and extent of clock sub-systems, bit-width of digital processing stages, and overall complexity. The enhanced CMTS architecture reduces connector density, reduces costs and other bulk components, and improves the system noise performance.

The enhanced CMTSs are incorporated into Fiber Nodes (FNs) or mini Fiber Nodes (mFNs), yielding enhanced Fiber Nodes (eFNs). These eFns distribute CMTS functionality deep into Hybrid-Fiber-Coax Networks (HFCN) rather than centralizing the CMTS functions within a single location. Moving the cable modem terminations closer to the subscribers shortens the analog RF paths required to support cable modems. Communication of both subscriber data and CMTS control data is performed over Ethernet-compatible packet networks between the field-based CMTSs and an upstream facility (e.g., the Head End), which includes an Internet gateway.

The distributed CMTS and packet network approach has many benefits. The data from multiple cable modems (after being demodulated by the CMTS from the received analog RF) and other upstream sources (to be discussed) is easily compressed, merged, and packet transmitted over common upstream network paths. The downstream data for multiple subscriber cable modems is likewise easily compressed, merged, and packet transmitted over common downstream network paths (for subsequent modulation by the CMTS). The compression, merging, and use of common paths, both reduces complexity and increases bandwidth utilization of the fiber plant, and thus reduces the fiber plant infrastructure cost per cable modem. Distributing CMTS functionality among multiple eFNs also reduces demands on already stretched resources at the Head End for space, power, and HVAC.

Dynamic channel allocation (including assignment and configuration) eliminates otherwise time-consuming and costly manual provisioning and re-provisioning of the enhanced CMTSs associated with installation and servicing. Dynamic channel allocation can also dramatically reduce the need to do manual node recombining (prompted by overcapacity situations) or manual channel reprovisioning (prompted by ingress noise). Channel selection and channel characteristics may be configured by transmission of a Channel Table Management Information Block (MIB), supplied over the packet network.

Dynamic channel assignment and configuration can be used manually or under programmed control to permit the headend to perform remote spectrum sampling at the eFN, via DSP-based translation, packet-based transmission, and subsequent reconstruction of the original spectra. Such remote sampling has a number of broad applications beyond those previously discussed, including signal monitoring, end-to-end Frequency Division Multiplexing (FDM), telemetry, and remote status monitoring.

More broadly, programmable channel assignment and configuration enables multiple communication channels, unrelated in function or frequency, to be isolated out of a wider spectrum and then efficiently combined and commonly transmitted over a network. The ability to combine multiple diverse streams provides greater functional density and significant savings in power, bandwidth, and cost compared to previous indiscriminate entire spectrum approaches to transmitting analog channels over networks.

In contrast to cable modem signals, which are readily demodulated to extract their underlying data, there are other channels (e.g., certain legacy telephony services) containing signals with modulation or encoding schemes that are unknown or best processed upstream. For these other channels, the invention provides for tunneling their spectrum over the same packet network as used for the cable modem data. It is possible to tunnel upstream only one, or several channels, as desired. If multiple channels are to be tunneled, they need not occupy a contiguous spectrum. The channels to be tunneled are isolated using digital receivers, translated to baseband, their data framed, merged with cable modem subscriber data, and transmitted over the packet network. Upstream, the framed channel data is parsed and the original channel spectrum reconstructed to permit information recovery.

This tunneling approach is particularly advantageous when it is not practical or possible to locally decode a particular channel's spectra within a larger local spectrum due to technical, financial, legal, or other restrictions. Instead of local decoding, the present invention transmits a digitized version of just the desired encoded spectra across a packet network to a remote site where it is practical or possible to perform the decoding. The original signal is then reconstructed and decoded using otherwise legacy methods.

The present invention thus provides a selective and efficient use of available bandwidth, in that it is not necessary to transmit the entire spectrum, when only one or few portions of the spectrum are desired. Furthermore, any or all packet data transmitted between the eFN and an upstream hub or head end may be selectively compressed. Both the selective transmission of upstream channels and the compression of data reduce bandwidth requirements all along the transmission path, contributing to reductions in power, cost, and size of the associated infrastructure.

Example network services compatible with and directly or indirectly supported by the present invention include DOCSIS cable modem (CM) services, VoIP (including compliance with the PacketCable standard) as well as legacy HFC telephony services, NVOD, VOD, compliance with OpenCable standards, and broadcast analog and digital video.

Nomenclature

In the communications industry certain common terms find repeated application at different levels of the design hierarchy and otherwise may be used with varying scope. As a result, it is possible that terms used in this application have multiple context-dependent meanings. Particular attention is required with regard to the terms demodulator, receiver, tuner, and front-end. Those skilled in the art will always be able to readily ascertain the correct meaning from careful study of the text and accompanying drawings.

BRIEF DESCRIPTION OF DRAWINGS

FIG. 1A is a top-level view of the cable system. FIG. 1B provides additional detail of the CPE of FIG. 1A. FIG. 1C provides additional detail of the ND of FIG. 1B.

FIG. 2A is a top-level view of the HFC/mFN cable system. FIG. 2B provides additional detail of the mFNs of FIG. 2A.

FIG. 3A is a top-level view of the eFN. FIG. 3B provides additional detail of the DSP Multi-Channel Transceiver ASIC of FIG. 3A. FIG. 3C provides detail of the underlying structure for the MAC processor and shared memory of FIG. 3A. FIG. 3D provides additional detail of the Analog Combine and Split Functions of FIG. 3A.

FIGS. 4A through 4E illustrate conceptually the process of digitizing a legacy upstream channel. FIG. 4A shows the 5-42 MHz return spectrum, including a desired 6 MHz legacy return channel. FIG. 4B represents a low-pass (anti-alias) filtering operation performed in the analog domain. FIG. 4C represents a band-pass (channel isolation) operation performed in the digital domain. FIG. 4D represents a resampling (baseband conversion) operation in the digital domain. FIG. 4E represents a low-pass filter and decimation operation performed in the digital domain.

FIG. 7A is a view that focuses on the relationship between the head-end and the customer premises. FIG. 7B is a view that focuses on the relationship between the cable-system head-end and other networks.

DETAILED DESCRIPTION

System Overview

Figure 1A:
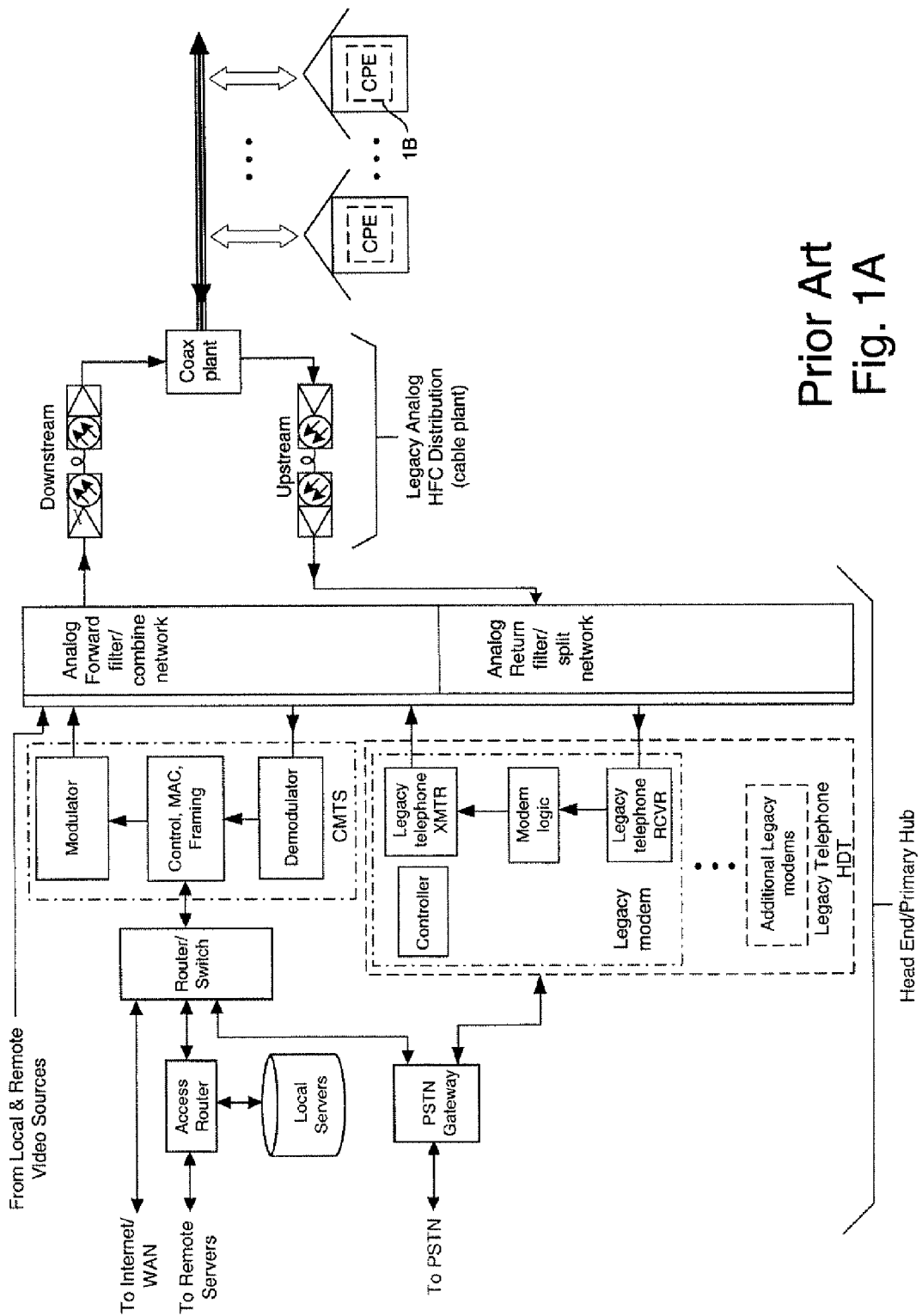
FIGS. 1A through 1C illustrate a prior-art HFC cable system having legacy return channels.
Figure 1B:
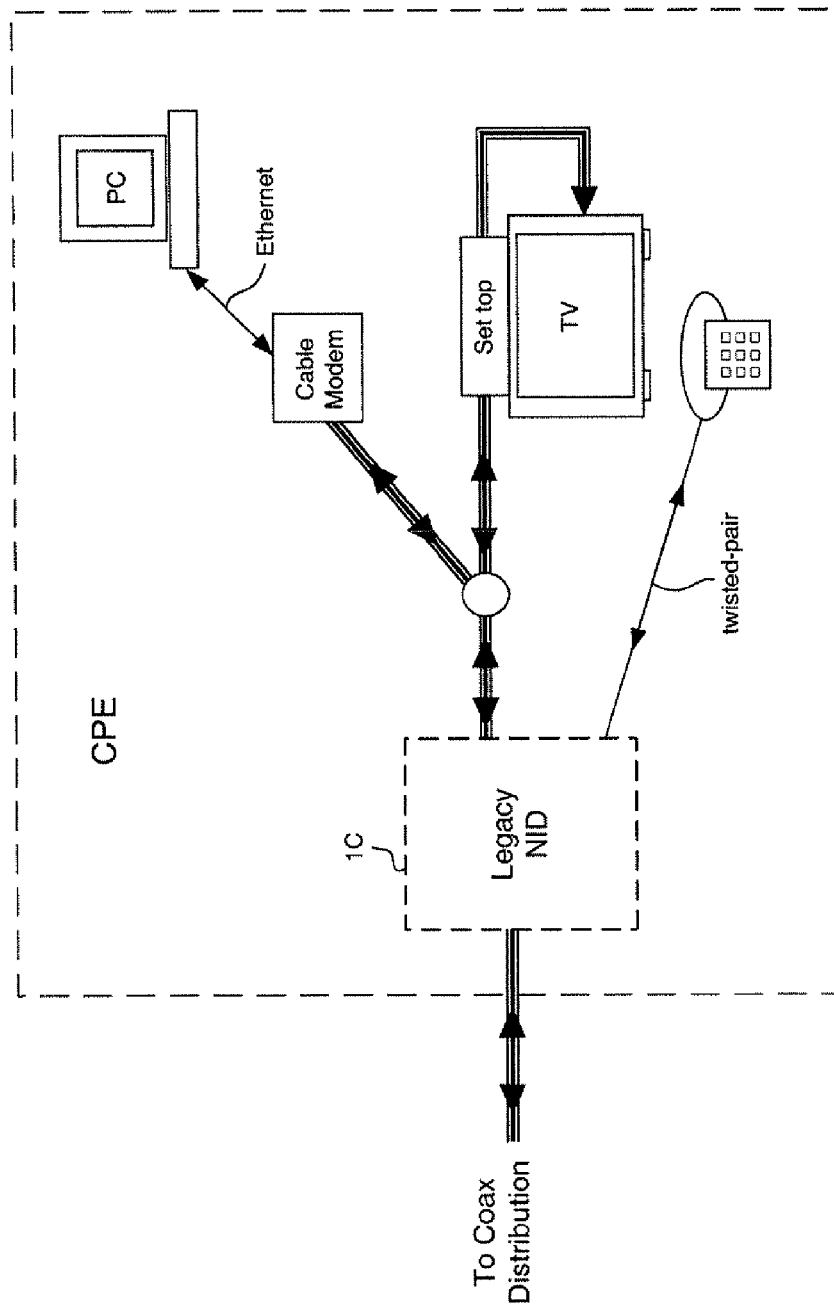
Figure 1C:
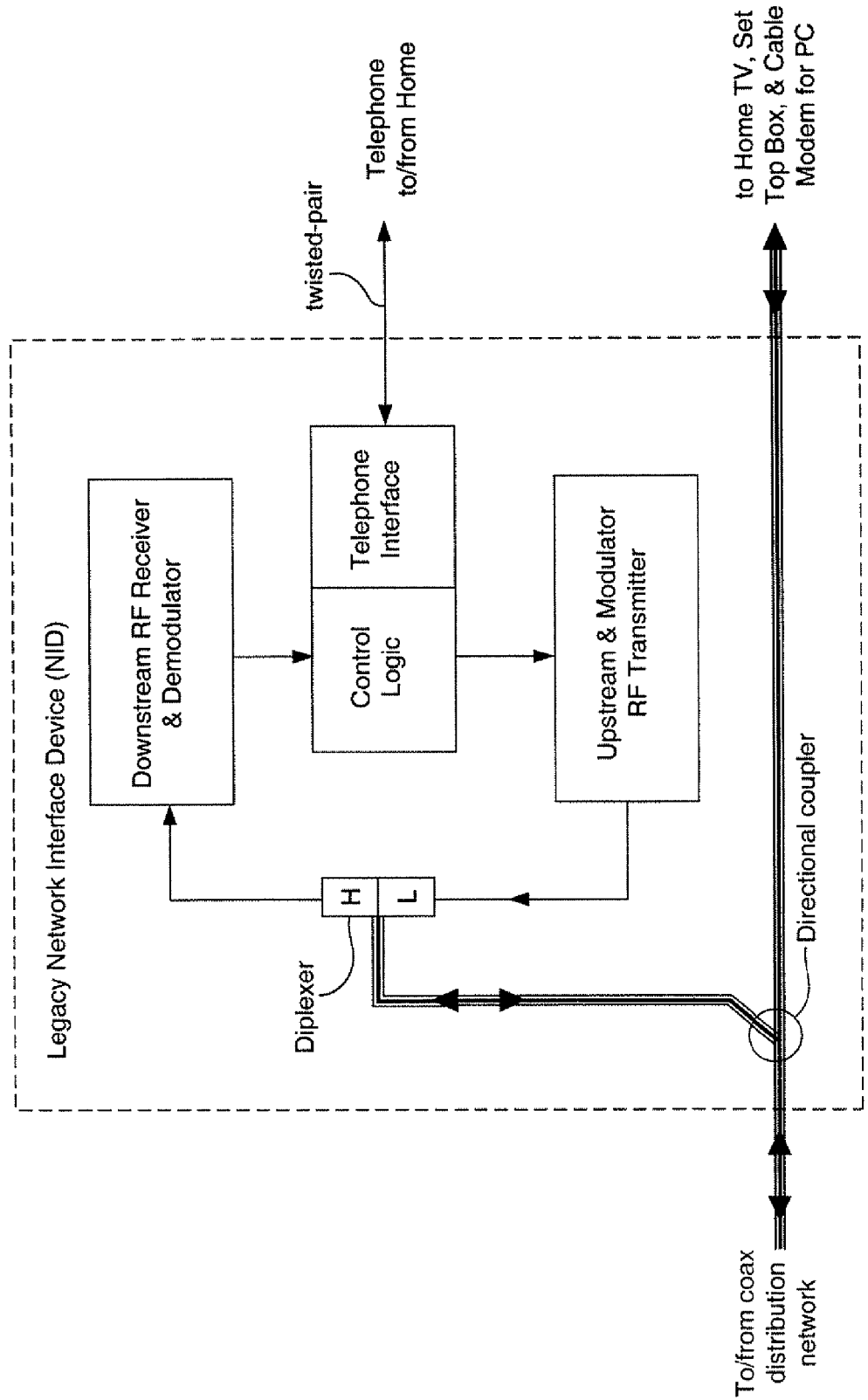
Figure 2A:
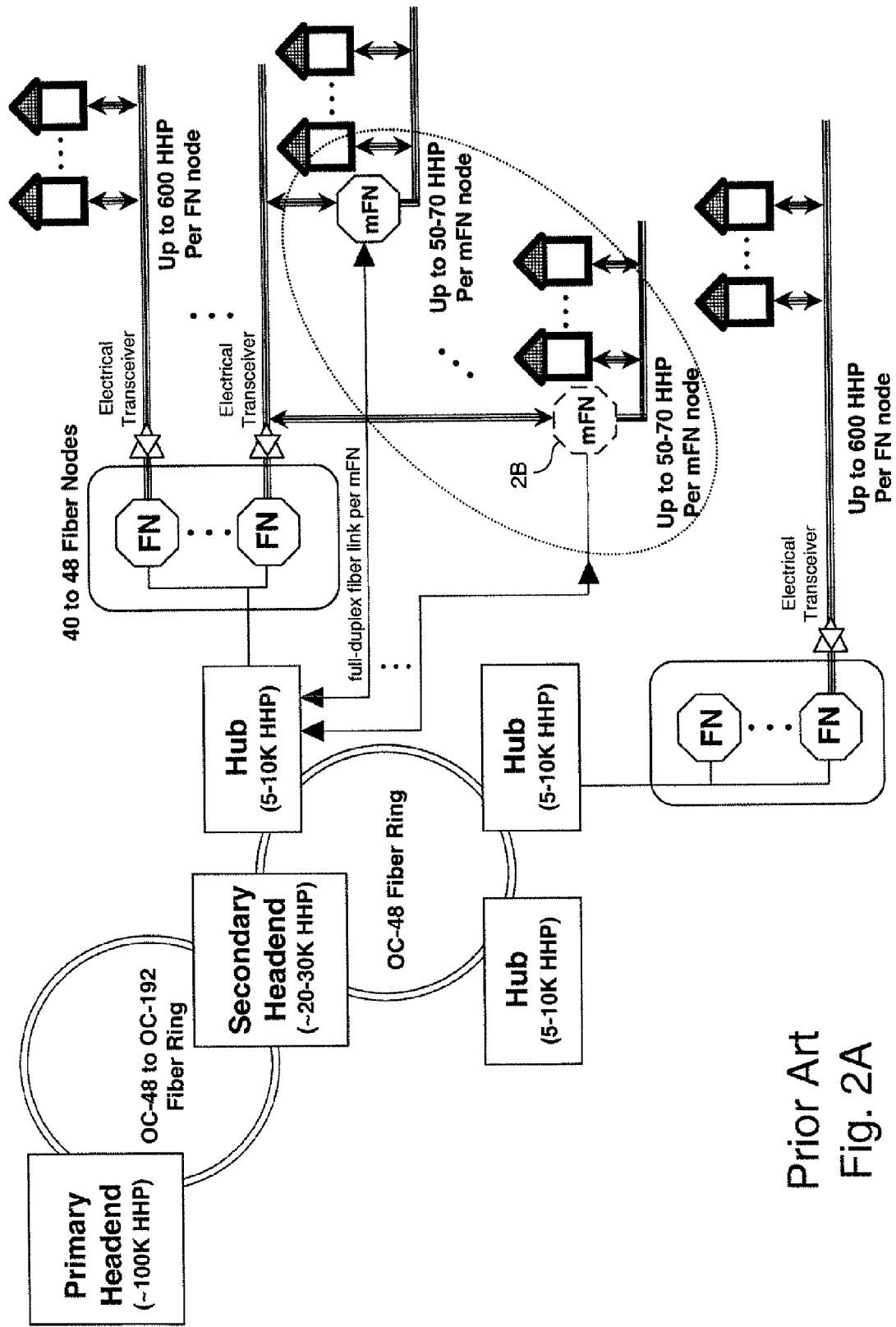
FIGS. 2A and 2B illustrate a prior-art HFC cable system having a packet fiber overlay using mini-FiberNodes (mFNs).
Figure 2B:
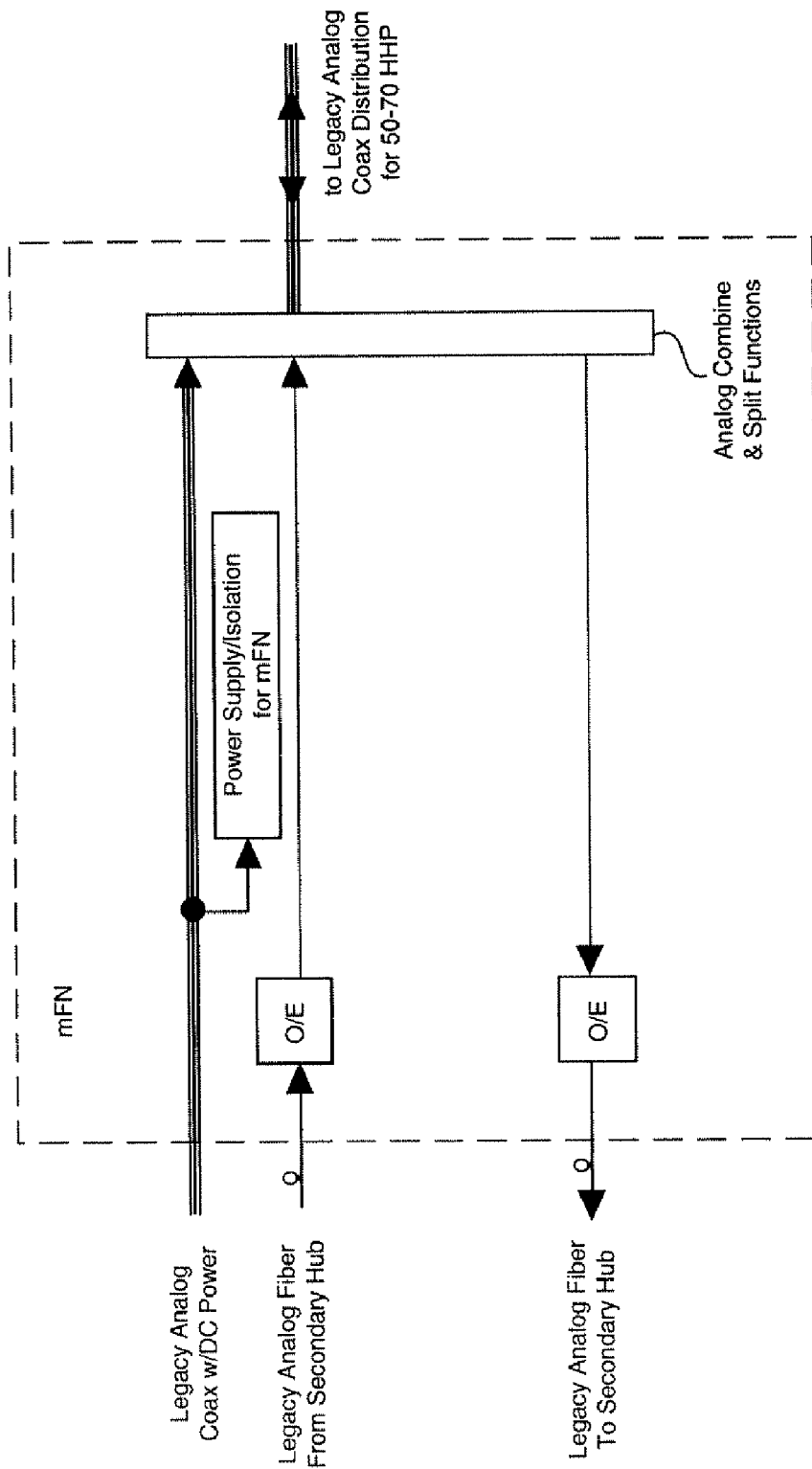

FIGS. 3A through 3D illustrate what the applicant refers to as an eFN (Enhanced FN), in accordance with the present invention. The eFN is a Fiber Node or mini Fiber Node (mFN) that includes a "mini-CMTS." As the term is used herein, a mini-CMTS is an enhanced CMTS that is characterized by high functional density, a compact form factor, low power consumption, and integral support for the merging of analog and digital channels for transmission over digital packet networks. The mini-CMTS of the present invention provides a highly compact and cost-effective implementation, including a substantial reduction in the number of bulky connectors required. Additional illustrative detail of various aspects of the eFN and its CMTS is available in the following applications (previously incorporated by reference, above): "ENHANCED CMTS FOR RELIABILITY, AVAILABILITY, AND SERVICEABILITY," "TRANSCEIVER CHANNEL BANK WITH REDUCED CONNECTOR DENSITY," and "MULTIPLE INPUT, MULTIPLE OUTPUT CHANNEL, DIGITAL RECEIVER TUNER,"

Systems of various size and scope that employ eFNs are shown in FIG. 7A, FIG. 7B, FIG. 7C, and FIG. 8. In an illustrative embodiment, in the subscriber direction the eFN interfaces with 50-70 residential subscribers (households passed, HHP) via coaxial RF interface (RF cable). In the headend direction, the eFN interfaces to a Master DAC Controller over a packet network, preferably via fiber. The packet network between the eFN and the Master DAC Controller may be basic, as suggested by FIG. 7C, or more complex, as suggested by FIG. 7B and FIG. 8. FIGS. 9 through 16 provide additional detail of various portions of the above mentioned eFN-based systems.

In an illustrative embodiment, 100 Mbps Ethernet is used over separate upstream and downstream fibers coupling the Head End (or a Secondary Head End, SH) to each of up to 8 daisy-chained eFNs via respective SONET/DWDM Add/Drop Multiplexers. In a first illustrative embodiment, the mini-CMTS 9000 of each eFN incorporates two downstream (DS) and four upstream (US) channels. These four available selectable US channels are provided by a single physical digitized input. The two DS channels are fully DOCSIS compliant. Two of the available selectable US channels per input are fully DOCSIS compliant and the other two available selectable US channel per inputs support legacy (proprietary) channels.

In a second illustrative embodiment, the mini-CMTS 9000 of each eFN incorporates four downstream (S) and sixteen upstream (US) channels. Four available selectable US channels for each of four physical digitized inputs provide the sixteen US channels. The four DS channels are fully DOCSIS compliant. In a first variation, all four of the available selectable US channels per input are fully DOCSIS compliant. In a second variation, three of the available selectable US channels per input are fully DOCSIS compliant and the other available selectable US channel per input supports a legacy (proprietary) channel.

Clearly, as capacity requirements dictate, embodiments having higher rate packet interfaces and additional US and DS channels are readily extrapolated from the first illustrative embodiment. The mini-CMTS is compatible with and directly or indirectly supports analog and digital modulated TV signals, DOCSIS cable modem services, VoIP (based on PacketCable or other standards), compliance with Open-Cable standards, legacy telephony and set top boxes.

The downstream data received from a regional packet network (or other WAN) via 100 Mbps Ethernet protocol is presented via the mini-CMTS's MAC to the downstream modulator formatted in 188 bytes MPEG frames which are, in turn, coded and modulated into a 44 MHz IF signal. The MPEG stream is compatible with and encapsulates DOCSIS frames.

The analog return spectrum (5-42 MHz) is digitized and selected upstream DOCSIS channels are demodulated and the data extracted. The packets are delivered by the DOCSIS MAC to the Ethernet interface and then transferred optically to the Head End (or SH) via the packet network.

Figure 5:
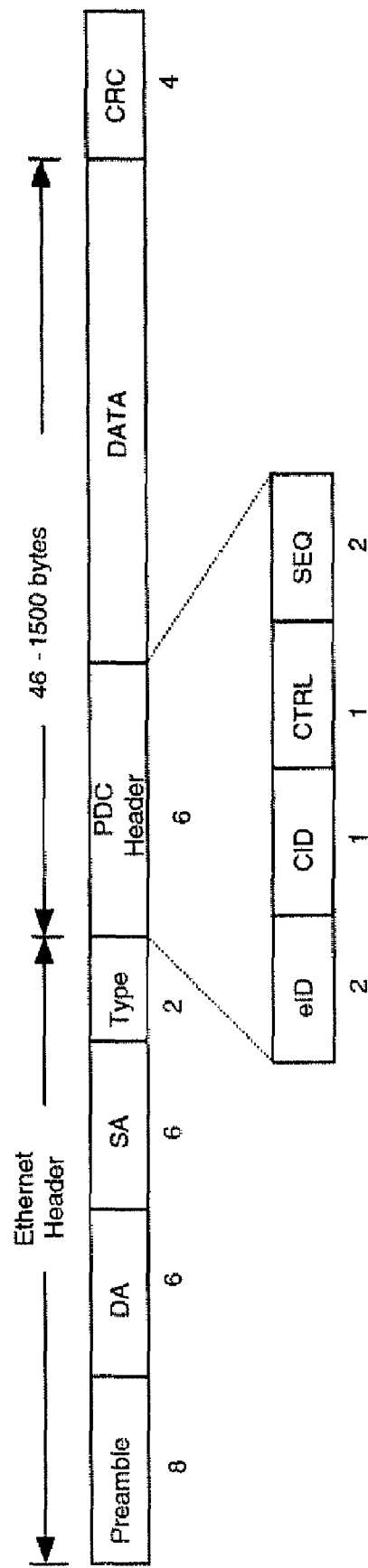
FIG. 5 illustrates the layer 2 encapsulation of digitized return channel data.
Figure 6:
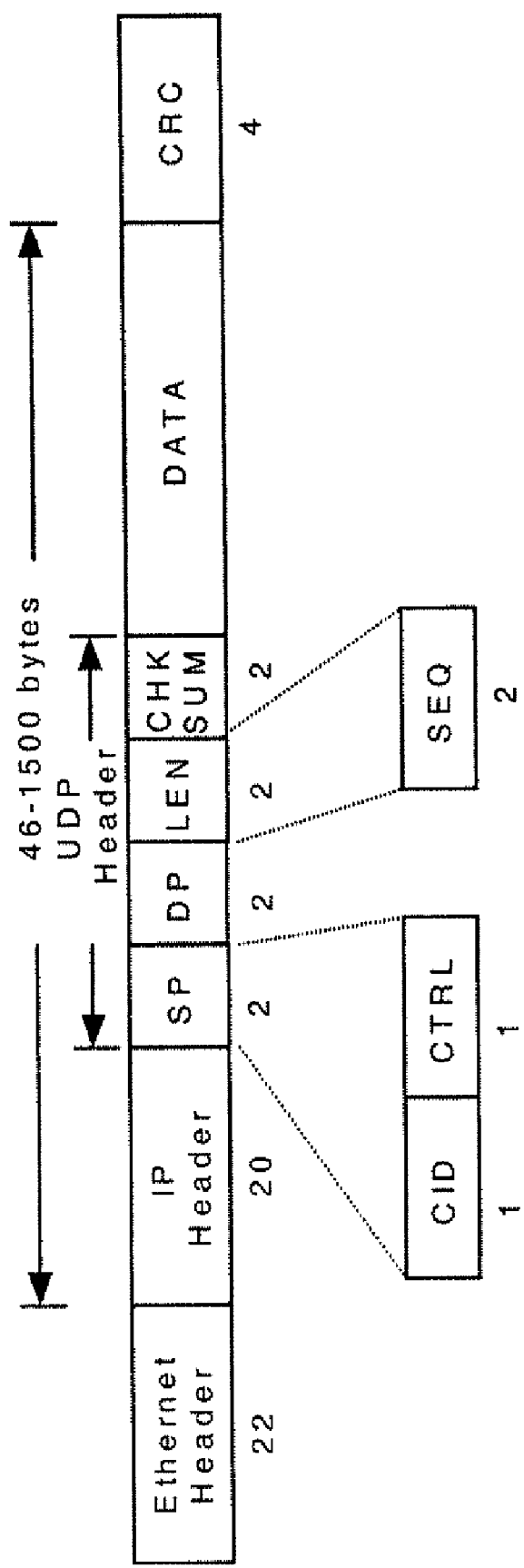
FIG. 6 illustrates the layer 3 encapsulation of digitized return channel data.

Similarly, from the same digitized analog return spectrum (5-42 MHz) legacy channels are selected, converted, and packetized into Ethernet frames using either a layer 2 or layer 3 protocol. These frames are forwarded to the cable Head End by commercially available switches. At the Head End, a Master DAC Controller extracts the bit streams from the Ethernet frames and recovers the analog channels. FIGS. 4A through 4E illustrate conceptually the process of digitizing a legacy upstream channel. FIG. 5 illustrates the layer 2 encapsulation of digitized return channel data. FIG. 6 illustrates the layer 3 encapsulation of digitized return channel data.

This selection of only desired return channels to be forwarded upstream yields a more efficient utilization of US bandwidth.

Mini-CMTS

Figure 3A:
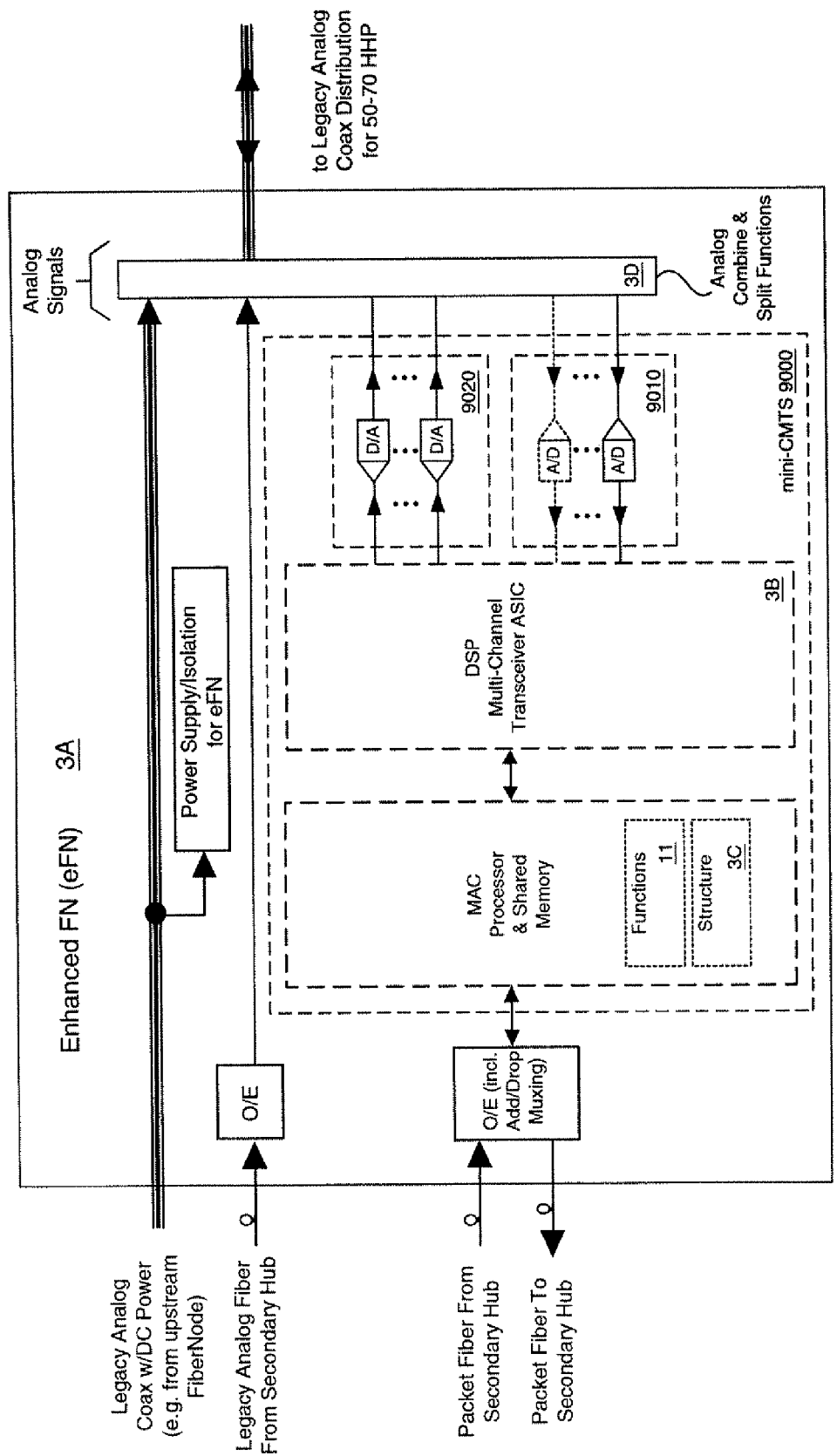
FIGS. 3A through 3D illustrate an eFN (enhanced Fiber Node), in accordance with the present invention.
Figure 3B:
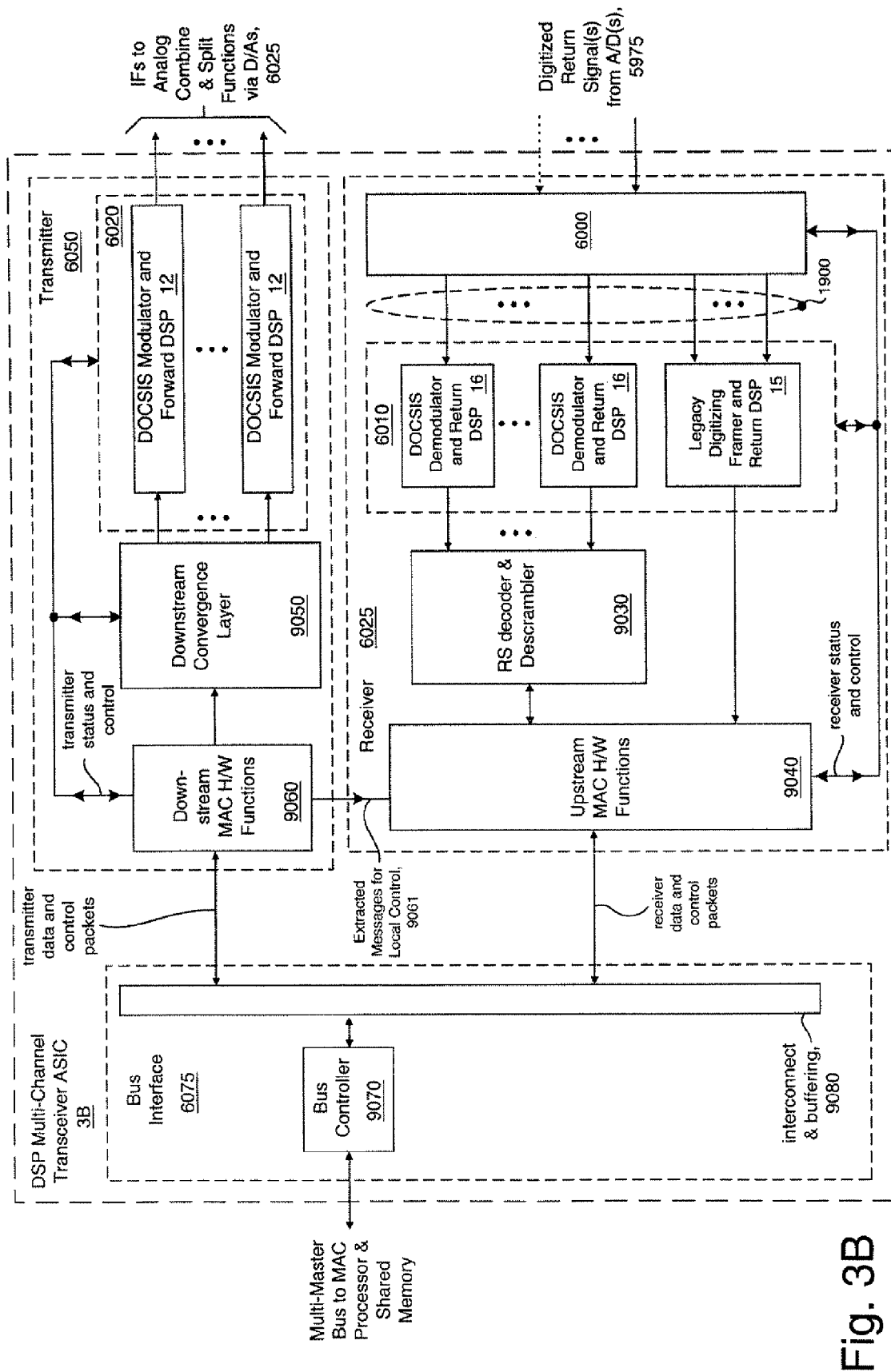
Figure 3C:
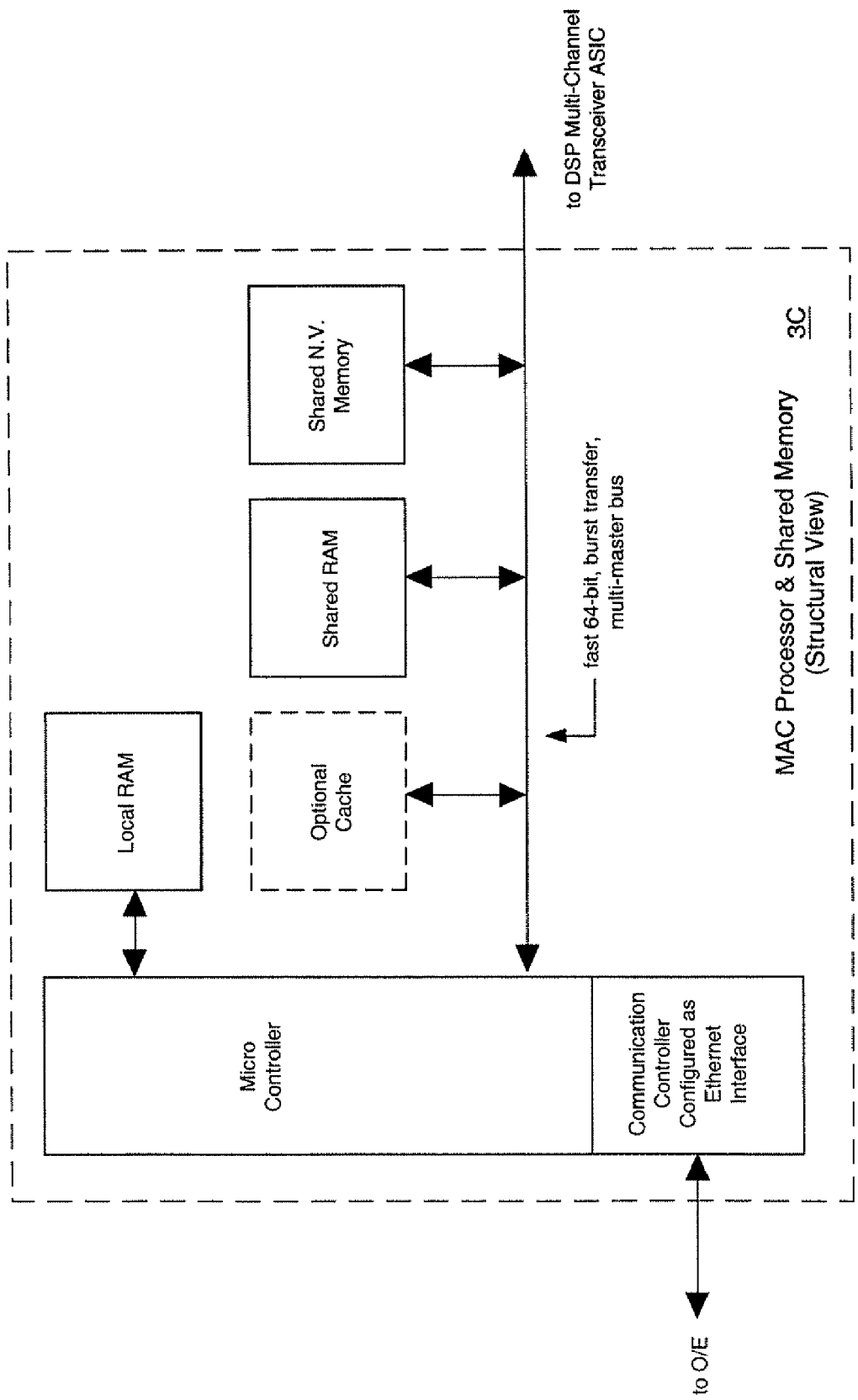

FIG. 3A is a top-level view of the eFN. The eFN includes an optical add/drop multiplexer, power extraction and distribution functions, Analog Combine and Split Functions 3D, and the mini-CMTS 9000. The mini-CMTS 9000 is made up of D/As 9020, A/Ds 9010, DSP Multi-Channel Transceiver ASIC 3B, and the MAC Processor and Shared Memory. The mini-CMTS is implemented on a PCB assembly that includes the DSP Multi-Channel Transceiver ASIC (also referred to as the HFC-ASIC), a Media Access Control (MAC) processor and shared memory block, a plurality of D/As, and one or more A/Ds. FIG. 3B provides additional detail of the DSP Multi Channel Transceiver ASIC of FIG. 3A. FIG. 3C provides detail of the underlying structure for the Mac processor and shared memory of FIG. 3A. The MAC structure includes a micro-controller, a communications controller configured as an Ethernet interface, RAM, non-volatile memory, and a multi-master bus.

Overview of the Analog Combine and Split Functions

Over the coaxial RF interface, the mini-CMTS supports DOCSIS MAC/PHY services over a number of upstream and downstream channels. The 5-42 MHz upstream spectrum from the legacy analog distribution generally includes both DOCSIS channels and legacy channels. This upstream is isolated by appropriate filtering and provided to one or more digitization paths (the optional additional paths being represented via dashed lines in FIG. 3A and FIG. 3D), each digitization path including AGC and A/D circuitry.

Figure 3D:
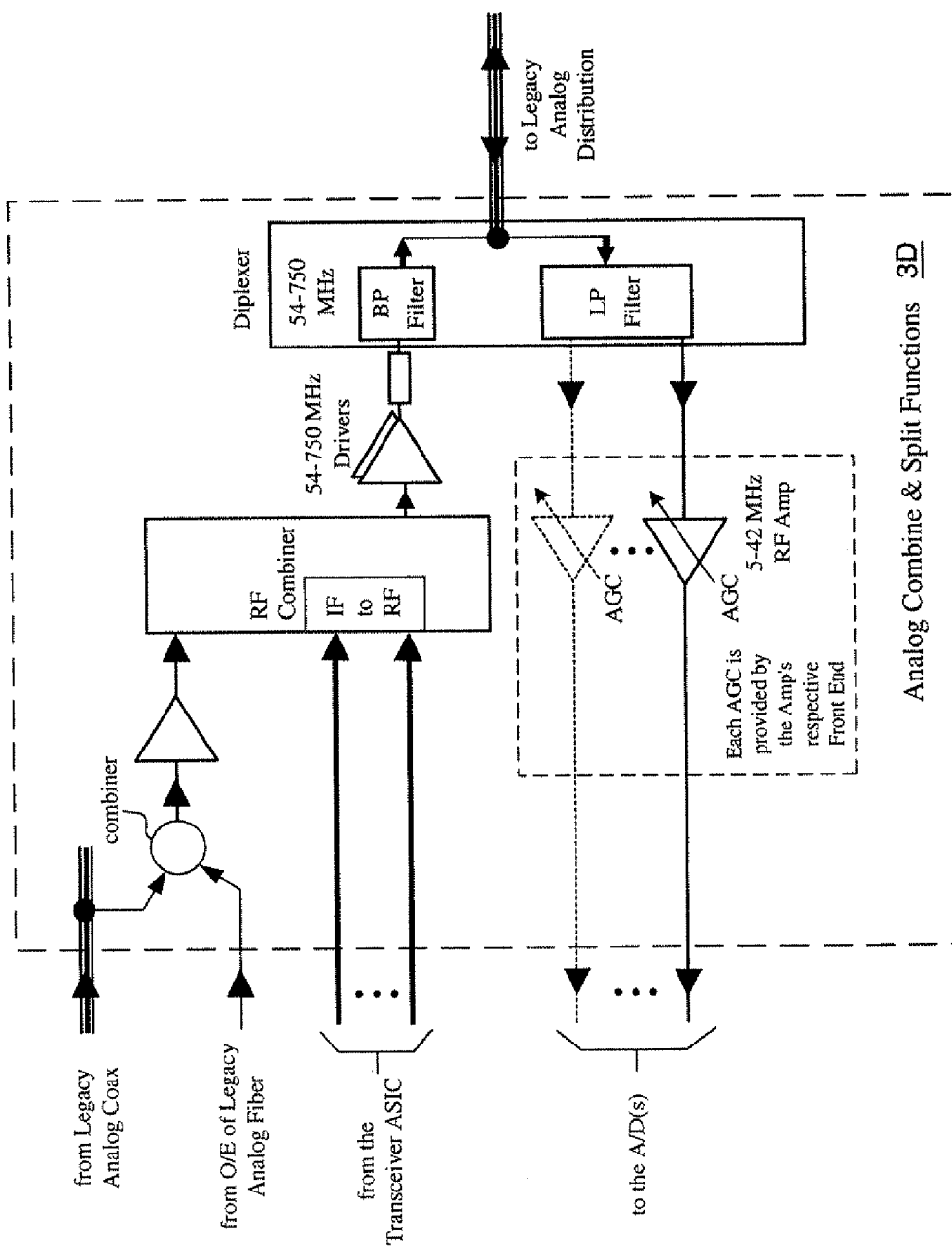

FIG. 3D provides additional detail of the Analog Combine and Split Functions of FIG. 3A. In an illustrative embodiment, IF-to-RF upconverters are provided for two digital downstream DOCSIS channels. Optionally, upconverters may be added for one or more legacy broadcast channels. Combiners stack the upconverted channels from the DSP Multi-Channel Transceiver ASIC along with downstream channels originating from the Legacy Analog Coax and Legacy Analog Fiber. Clearly, the upconverters and combiners must meet the constraints associated with eFN usage. In an illustrative embodiment the IF-to-RF upconverters are addressable via an integral I2C industry standard bus and meet the specifications provided in Table 1 through Table 3, below.

TABLE 1

IF-to-RF Physical Requirements

| Parameter | Value(s) |
|---|---|
| Power Supplies | +5 V, +12 V |
| Ambient Temp. | −40 C. to +85 C. |

TABLE 2

IF-to-RF IF Input Requirements

| Parameter | Value(s) |
|---|---|
| IF frequency | 44 MHz |
| Bandwidth | 6 MHz |
| Input level | +25 to +35 dBmV |
| IF attenuator step-size | 1 dB (0.1 dB preferred) |
| AGC | enable/disable |

TABLE 3

IF-to-RF RF Output Requirements

| Parameter | Value(s) |
|---|---|
| Frequency | 550-870 MHz |
| Frequency step | 50 KHz or better |
| Frequency accuracy | 2 ppm |
| Gain control | +45~+61 dBmV |
| Spurious emissions, 50-900 MHz | −60 dBc |
| Modulated Adj. Noise, 3.75-9 MHz | <−62 dBc |
| Carrier mute | automatic upon frequency change |

Overview of the DSP Multi-Channel Transceiver ASIC

In an illustrative embodiment, the ASIC 3B includes bus interface 6075, transmitter 6050, and receiver 6025. The transmitter and receiver respectively include modulators and demodulators designed to meet the DOCSIS specifications. The receiver also includes processing for legacy return channels.

The bus interface 6075 provides access to the multi-master bus and thus couples both the transmitter and receiver to the MAC processor and shared memory 11. In the illustrative embodiment of FIG. 3B, a single bus controller is shared by the transmitter and receiver. The transmitter and receiver are shown coupled to the bus controller via interconnect and buffering 9080. Those skilled in the art will recognize that other methods of coupling to the multi-master bus are available and equivalent within the overall context of the present invention.

The transmitter includes a number of function blocks common across all channels as well as channel-specific blocks. The common functions include downstream MAC H/W functions 9060 (i.e., those DS MAC functions implemented in hardware) and downstream convergence layer functions 9050. The downstream MAC H/W functions block 9060 can pass extracted messages for local control 9061 to the upstream MAC H/W functions block 9040. Multi-channel modulator block 6020 includes a DOCSIS modulator and forward DSP block 12 for each transmit channel. The transmitter receives an MPEG-compatible stream for each channel (two in an illustrative implementation) and delivers a corresponding downstream IF output signal at 44 MHz.

Figure 14:
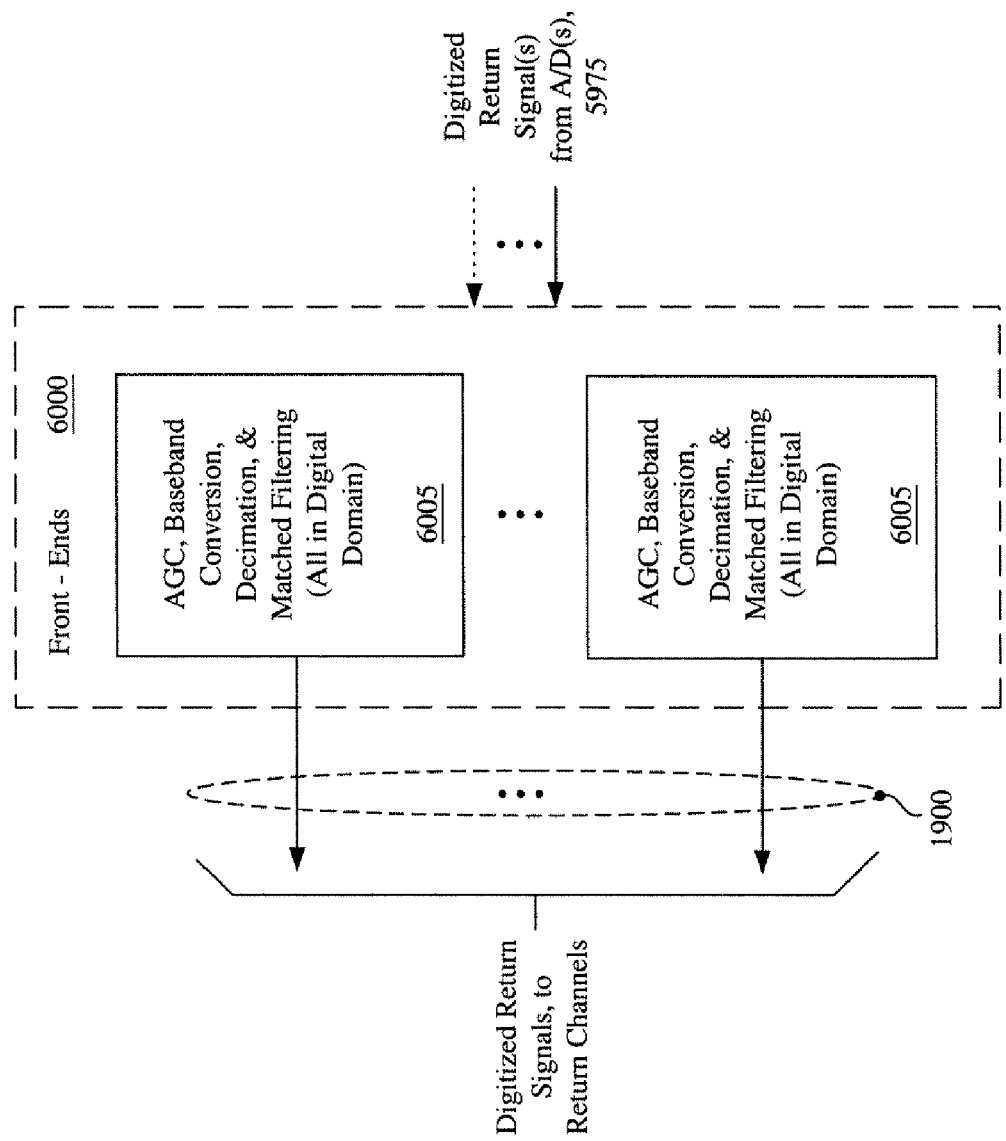
FIG. 14 provides internal detail of the front-end(s) 6000 of FIG. 3B.
Figure 15:
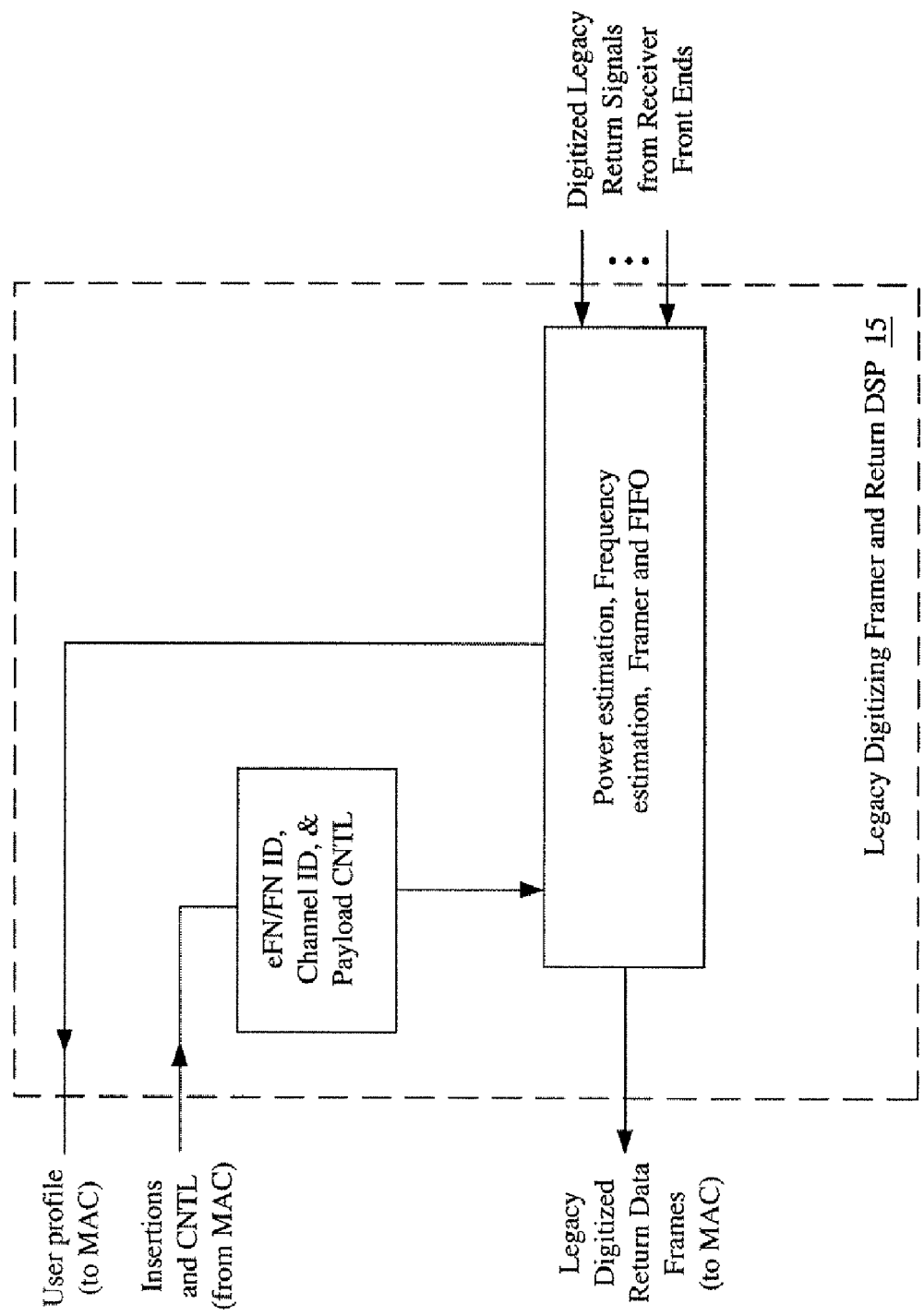
FIG. 15 provides internal detail of the Legacy Digitizing Framer And Return DSP 15 of FIG. 3B.

The receiver includes a front-end 6000, channel-specific processing 6010, a RS decoder and Descrambler 9030, and Upstream MAC H/W functions 9040. FIG. 14 provides additional detail of Front-end 6000. Front-end 6000 includes separate front-ends 6005 for each channel. Separate digitized signal outputs are provided for each channel; collectively these outputs comprise signals 1900. In an illustrative embodiment, at least some channel outputs from 6000 include I and Q quadrature pairs for a given channel. At least one digitized return signal is provided to front-end 6000. In a preferred embodiment, each of a plurality of provided digitized return signals, corresponding to respective external A/Ds and associated analog input circuits, is selectively coupled to one or more of the individual front-ends 6005.

Figure 16:
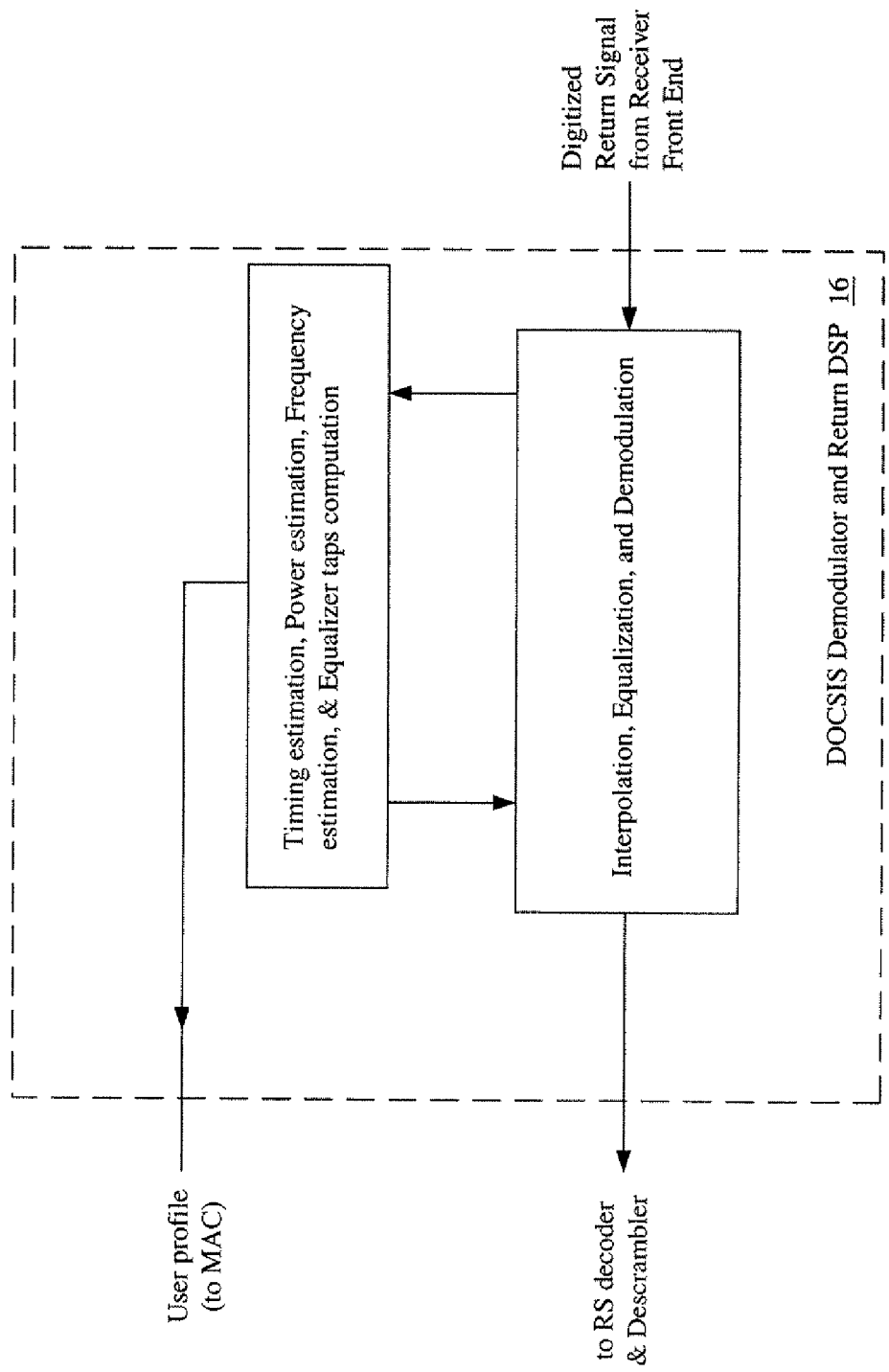
FIG. 16 illustrates the DOCSIS-specific return receiver functions implemented on a per-channel basis.

The front-end channel outputs are provided to the channel-specific processing within block 6010. These channel outputs generally correspond to both DOCSIS and legacy return channels. Each DOCSIS channel (2 in a first illustrative embodiment) output from the front-end is processed in a DOCSIS Demodulator and Return DSP block 16. As depicted in FIG. 16, this block provides demodulation of the TDMA upstream transmissions originating from Cable Modems or Set Top boxes. The DOCSIS Demodulator and Return DSP logic 16 provides the MAC layer with channel profile information, including timing, power, and frequency estimation data. The demodulator outputs of each DOCSIS Demodulator and Return DSP block 16 are collectively provided to the RS Decoder and Descrambler 9030, the output of which is coupled to the Upstream MAC H/W Functions 9040. The legacy channels (2 in a first illustrative embodiment) output by the front-end are processed in Legacy Digitizing Framer and Return DSP block 15, the output of which is also coupled to the Upstream MAC H/W Functions 9040.

Details of the ASIC Transmitter Functions

The Downstream Transmission Convergence (DTC) Layer block 9050 provides an opportunity to transmit additional services, such as digital video, over the physical-layer bit-stream. This function provides at its output a continuous series of 188-byte MPEG packets compatible with ITU-T H.222.0, each constituting of a 4-byte header followed by 184 bytes of payload. The header identifies the payload as belonging to the data-over-cable MAC that can be interleaved with other MPEG data flows providing different services. Note that a DOCSIS MAC frame may span over multiple MPEG packets and an MPEG packet may contain multiple DOCSIS MAC frames.

Figure 12:
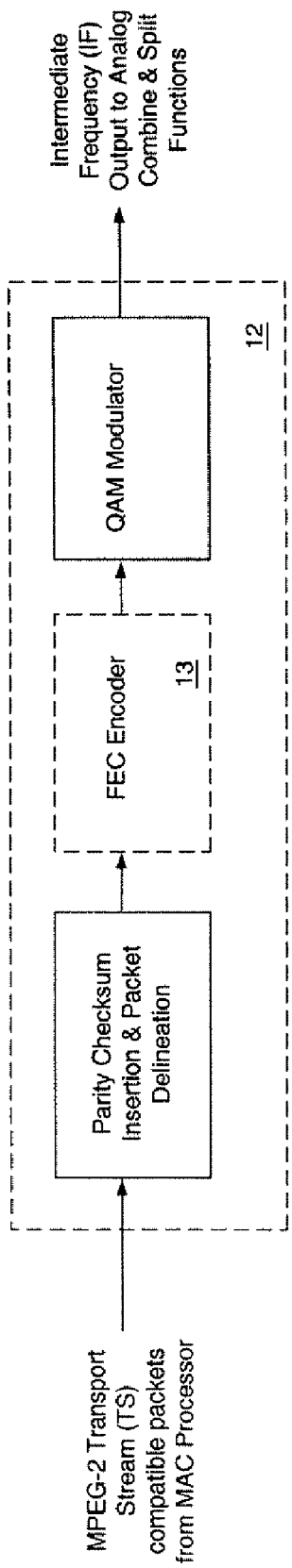
FIG. 12 provides internal detail of the downstream transmitter functions implemented on a per-channel basis.

The DOCSIS Modulator and Forward DSP block 12 implements the Physical Media Dependent (PM) functions described in the ITU J.83-B Recommendations with an exception for the interleaving function that must conform only with a subset of the "Level 2" of the ITU recommendation. FIG. 12 provides internal detail of these functions. The first sub-block monitors the MPEG-2 Transport Stream compatible packets and inserts a parity checksum for detected sync bytes (1st byte having a value of 47 HEX) to provide error detection capability and packet delineation.

Forward Error Correction

Figure 13:
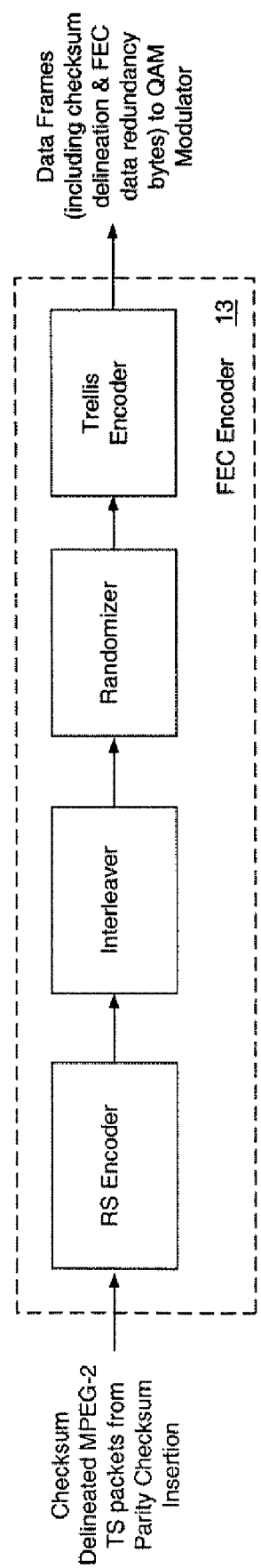
FIG. 13 illustrates sub-functions of the FEC block of FIG. 12.

FIG. 13 illustrates the sub-functions of the Forward Error Correction (FEC) block of FIG. 12. The Reed-Solomon encoder implements an RS(128,122,3) code over GF(128). It provides encoding to correct up to 3 RS symbol (7-bit size) per RS block of 128 symbols.

The next FEC sub-block is a convolutional type interleaver supporting variable depth I=128, 64, 32, 16, and 8. It evenly disperses the symbols, protecting against a burst of symbol errors from being sent to the RS decoder at the receiver side. A frame synchronization sequence trailer delineates the FEC frame in order to provide synchronization for RS decoding, de-interleaving as well as de-randomizing at the receiver side. Four data bits are transmitted during the FEC frame sync interval in order to convey the interleaving parameters to the receiver. Note that the sync trailer depends on the modulation format.

Next a synchronous randomizer provides for even distribution of the symbols in the constellation. The randomizer is initialized during the FEC frame trailer and enabled at the first symbol after the trailer; thus the trailer is not randomized.

The Trellis Encoder uses an overall code rate of 14/15 with 64-QAM and 19/20 with 256-QAM. It is based on a 1/2-rate binary convolutional encoder punctured to 4/5 rate. In 64-QAM mode, 28 bits are collected in block, coded and mapped to 5×64-QAM symbols. In 256-QAM mode, 38 bits feed the trellis encoder and deliver 40 bits that are mapped to 5×256-QAM symbols. Note that the trellis-coding scheme used is 90° (90-degree) rotationally invariant to avoid FEC resynchronization in the receiver after carrier phase slips.

QAM Modulator

The 64- or 256-QAM symbols at the trellis encoder output of the FEC Encoder are pulse shaped using square-root raised cosine Nyquist filtering before modulation around a selected RF carrier. The roll-off factor is a=0.18 for 64-QAM and a=0.12 for 256-QAM. The channel spacing (bandwidth) is 6 MHz, which leads to a symbol rate of 5.057 Mbaud with 64-QAM and 5.36 Mbaud with 256-QAM. The RF frequency band is 91 to 857 MHz. In practice, the modulation is first performed using an IF stage with a standard IF frequency at 43.75 MHz (36.15 in Europe), and next the signal is up-converted from IF to RF using an up-converter function.

Overview of DOCSIS Receive Functions

The upstream receiver 6025 incorporates all the upstream functions required to implement the DOCSIS Physical Media Dependent (PMD) sub-layer. The receiver extracts the data packets transmitted by the Cable Modems (CMs) and sends them to the MAC layer. If the concatenation/fragmentation function is used, the data packets delivered by the upstream receiver are fragment payloads of MAC frames. If not, the data packets are full DOCSIS MAC frames. The upstream receiver is a multiple channel burst receiver supporting for each burst: a variable burst length (0-255 minislots), flexible modulation scheme (QPSK, 16-QAM), variable symbol rate (5 values from 160 to 2560 kbaud), variable preamble length and value, variable randomizer seed, and programmable FEC. Each upstream receiver channel is provisioned appropriately for each of these parameters via the management and control functions of the MAC layer. In addition, the upstream receiver integrates channel performance and monitoring function that feeds the MAC layer with all the necessary information for ranging purposes and for channel capacity optimization.

Front-End

The front-end 6000 down-converts each channel signal to baseband, filters the down-converted signal using a matched filter (roll-off factor a=0.25), and performs synchronization in timing and frequency. Additional illustrative detail of a front end is available in the following application (previously incorporated by reference, above): "MULTIPLE INPUT, MULTIPLE OUTPUT CHANNEL, DIGITAL RECEIVER TUNER."

Burst Demodulator

Each QPSK or QAM burst modulated channel signal is then demodulated within a respective DOCSIS demodulator and Return DSP block 16 in order to extract the data transmitted within the burst. The demodulator may also equalize the signal before its decision circuit in order to compensate for echoes and narrow-band ingress noise. Gain control and power estimation functions are necessarily provided to insure correct demodulation. Each DOCSIS demodulator and Return DSP block 16 delivers at its output one or more FEC scrambled packets.

Descrambler and FEC Decoder

The operation of RS Decoder and Descrambler block 9030 is now examined. At the beginning of each data burst, the register of the de-scrambler is cleared and the seed value is loaded. The de-scrambler output is combined in a XOR function with the data. Next, the information data is separated into FEC codewords and decoded, where the FEC is an RS (k, n, T) with k=16 to 253, n=k+2T and T=0, 10. T=0 means the FEC is turned off. Note that the last codeword can be shortened and thus, the RS decoder must fill the codeword with the necessary number of zeros before decoding. Finally, the decoded data is fed to the MAC layer.

Performance Monitoring

In an illustrative embodiment, the upstream receiver also provides the following per-channel performance information to the MAC layer:

a) Timing estimation;
b) Frequency offset estimation;
c) Power estimation (signal and noise);
d) Pre-equalizer taps estimation;
e) BER estimation (preamble and FEC);
f) Collision indication;
g) Missed acquisition of burst (due collision or noise); and
h) RF Spectrum monitoring.

Legacy Upstream Channel Digitizer Functions

FIGS. 4A through 4E illustrate conceptually the process of digitizing a legacy upstream channel. (The understanding of this discussion is facilitated by examination of FIG. 3A, FIG. 3B, FIG. 3D, FIG. 14.) FIG. 4A shows the 5-42 MHz return spectrum, including a desired 6 MHz legacy return channel. FIG. 4B represents a low-pass (anti-alias) filtering operation performed in the analog domain (see also FIG. 3D) to eliminate out of band noise and unwanted signals. Subsequently, one of the provided A/Ds (see reference 9010 in FIG. 3A) digitizes the entire return spectrum in the Nyquist space.

Once digitized, the desired legacy signal needs to be converted to baseband, isolated from other upstream signals, and decimated. FIGS. 4C through 4E illustrate these functions conceptually. FIG. 4C represents a band-pass (channel isolation) operation performed in the digital domain at the provisioned frequency and bandwidth, as directed by the MAC control functions. As illustrated in FIG. 4D, the signal is then resampled, converted to baseband, and decimated by a multistage decimation process. The data is subsequently digitally filtered, as illustrated in FIG. 4E, to eliminate unwanted spectra-replicas. In an illustrative embodiment, the digitized legacy signal is baseband converted prior to isolation and decimation. As represented in FIG. 14, these functions are performed for each channel by a respective block 6005, within front-ends 6000.

The digital baseband signal is then sent to the Upstream MAC H/W Function block 9040 via Legacy Digitizing Framer and Return DSP block 15. In the Mac layer the digitized baseband stream is organized into Ethernet frames. Legacy Digitizing Framer and Return DSP 15 facilitates the framing process, including the identification of each frame by eFN-ID, channel-ID and Payload control (using Source Address, SA, and Destination Address, DA). Legacy Digitizing Framer and Return DSP also provides the MAC layer with user profile information, including power and frequency estimation data.

Figure 7A:
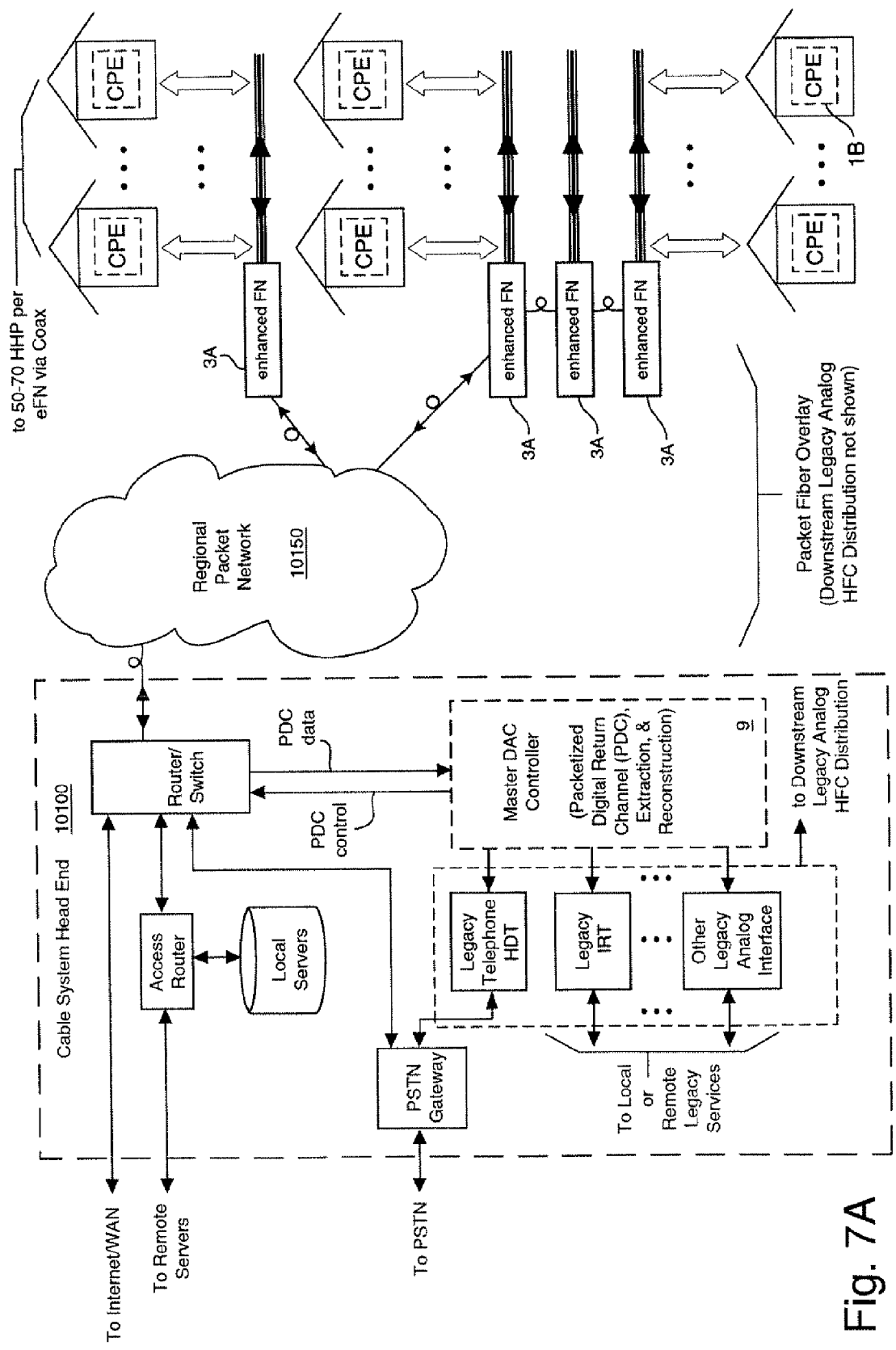
FIGS. 7A and 7B illustrate the system environment for an HFC cable system having a packet fiber overlay using eFNs, in accordance with the present invention.
Figure 9:
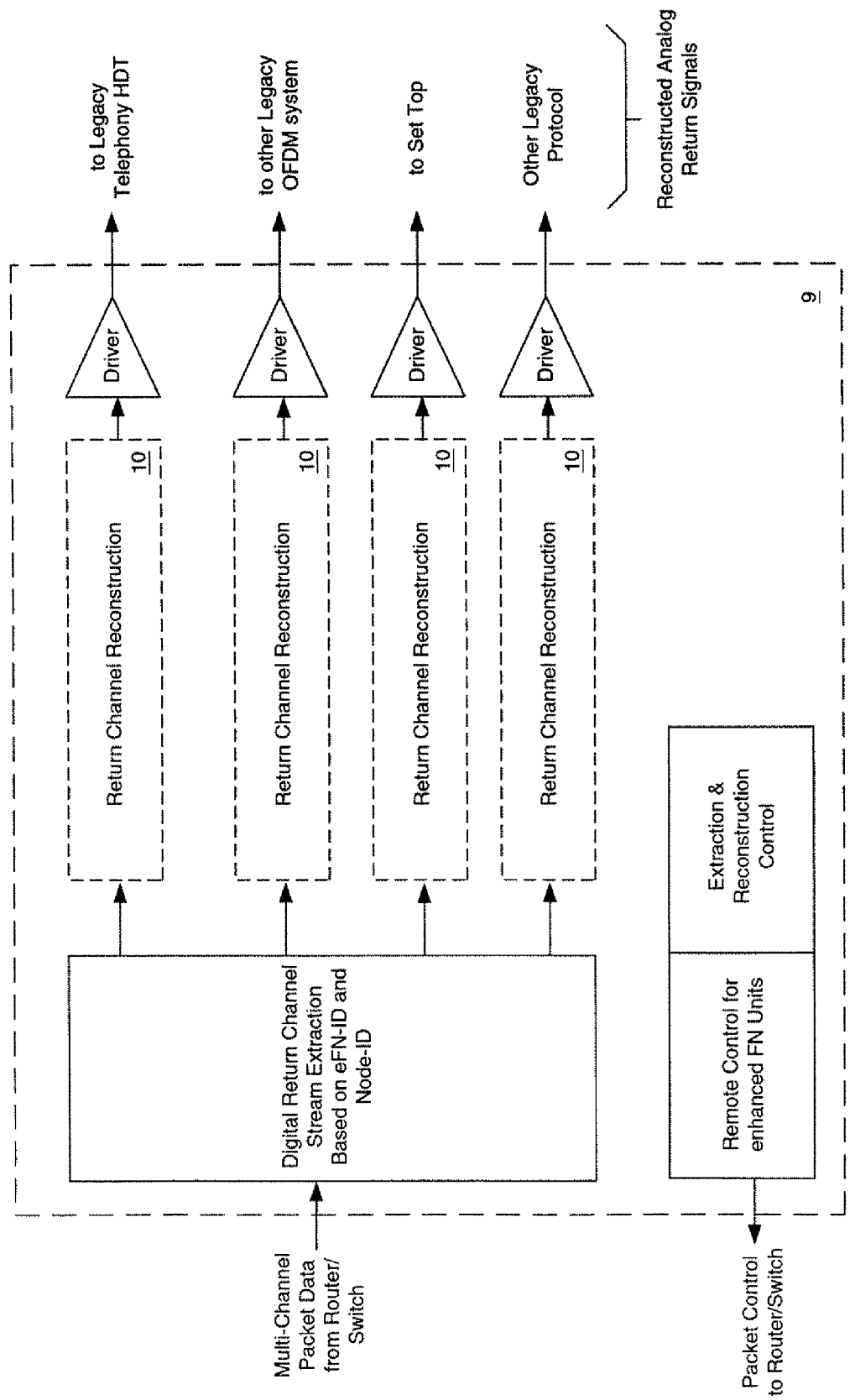
FIG. 9 provides internal detail of the PDC, Extraction, and Reconstruction block of FIG. 7A.
Figure 10:
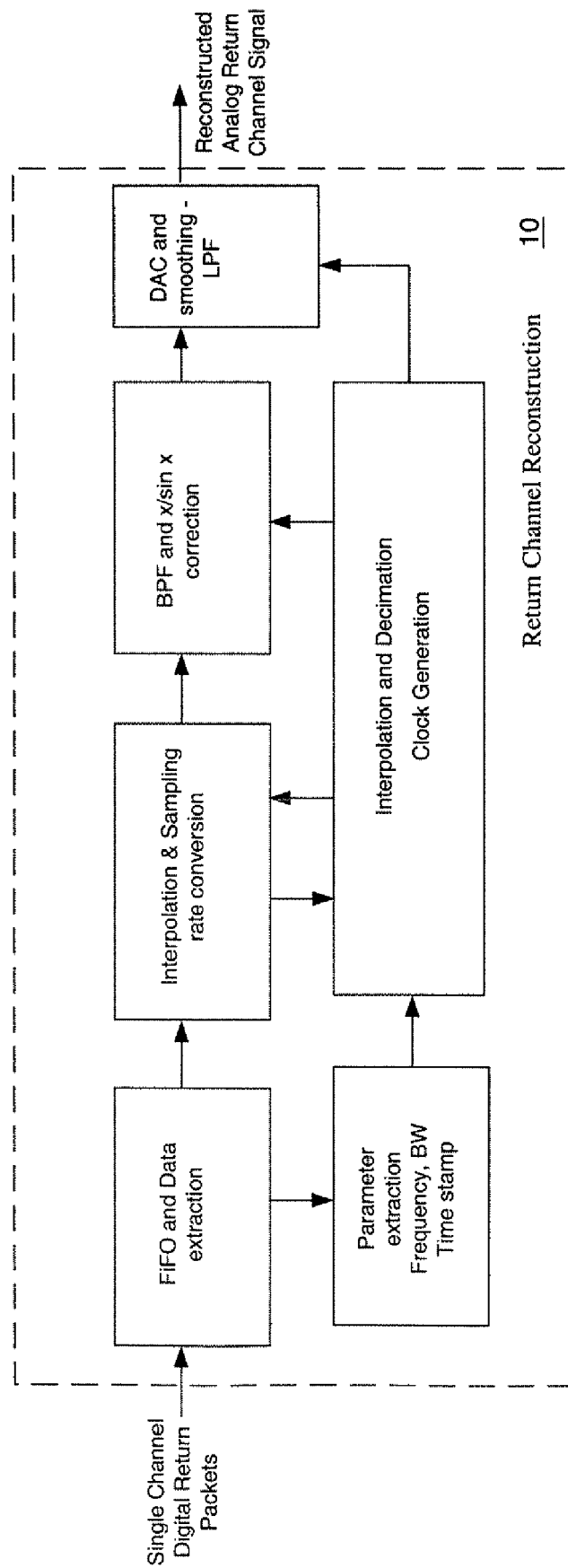
FIG. 10 provides internal detail of the Return Channel Reconstruction block of FIG. 9.

At the Head-end, as shown in FIG. 7A, FIG. 9, and FIG. 10, a reverse process (discussed in detail below) performs extraction and reconstruction of an exact replica of the legacy signal (s) both in frequency position and bandwidth. The reconstructed signals may then be submitted to the appropriate legacy equipment for demodulation and data retrieval. This combination of digitization, framing, and integration with other upstream packet traffic in accordance with the present invention, does not increase the complexity of the upstream receivers and provides a substantial reduction in data transfer requirements (e.g., by a factor of 10) compared to digitizing the entire upstream spectrum.

MAC Layer Functional Overview

In an illustrative embodiment, the eFN of FIG. 3A implements all the MAC functions interfaces required to be fully compliant with DOCSIS. The eFN is intended to be software upgradeable for present and future versions of DOCSIS. MAC layer functions beyond those required by DOCSIS are also provided to support at least two Legacy channels, with respective MIBs and Messages.

Figure 11:
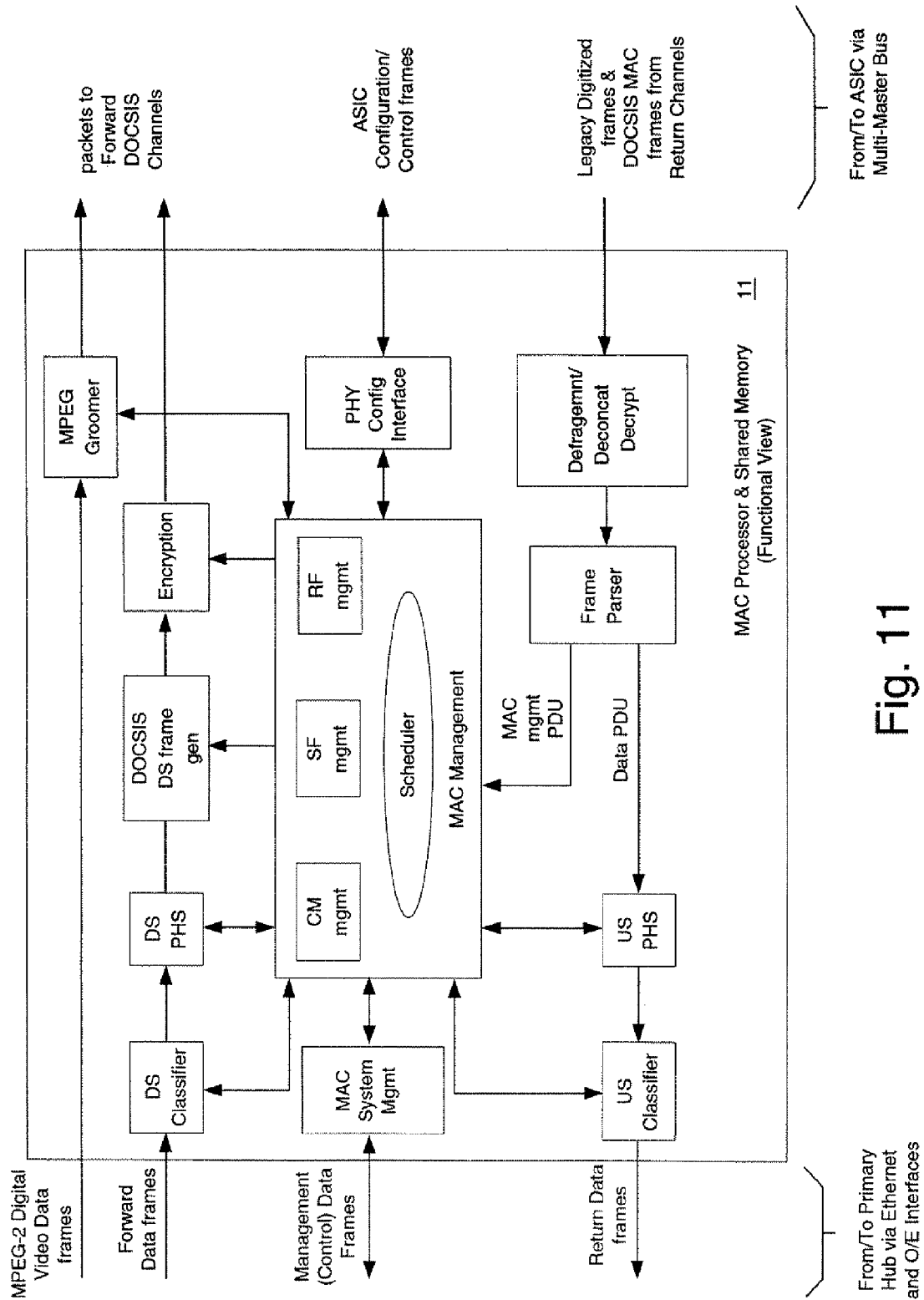
FIG. 11 illustrates the relationship between MAC functions in the MAC processor and shared memory of FIG. 3A.

FIG. 11 illustrates the MAC functions performed by the MAC Processor and Shared Memory. These functions include: PHY configuration and monitoring; de-fragmentation, de-concatenation, and decryption; MAC management; CM management;

Service Flow (SF) management; scheduler; RF management; Upstream (US) and Downstream (DS) Classifier; Upstream (US) and Downstream (DS) Payload Header Suppression (PHS); encryption; security based on the DOCSIS Baseline Privacy [BPI] and Baseline Privacy Plus [BPI+] specifications; DOCSIS DS frame generation; and CMTS MAC system management.

DOCSIS requires the mini-CMTS to support various functions and protocol layers above the MAC sublayer. These are listed in table 4, below.

TABLE 4

DOCSIS functions implemented in an illustrative embodiment

| Function Type | Examples within Type |
| --- | --- |
| Forwarding and filtering | Layer 2 Packet Forwarding, Packet Filtering |
| Network-layer protocols | IGMP, ICMP |
| Higher-layer functions | TFTP, DHCP, TOD, RSVP, RTP, COPs, DNS, RADIUS |
| CMTS management | CM Directory, SNMP, CLI |
| Network Side Interface (NSI) | WAN and MPEG interfaces |

The mini-CMTS is required to perform the following functions as part of managing itself: initialization and power on self-test; fault and performance monitoring; diagnostics; alarming via LEDS and the command line interface; and background maintenance functions.

Microprocessor and Transport Interfaces (Ethernet I/F)

FIG. 3C provides detail of the underlying structure for the MAC processor and shared memory of FIG. 3A. The strict physical limitations of the eFN require a solution that is low-power and highly integrated, but capable of supplying the significant computational horsepower and I/O bandwidth required by the Real Time Operating System (RTOS) and MAC functionality. In an illustrative embodiment, a Motorola MPC8260 PowerQUICCC II is used. This versatile communications processor integrates on to a single chip a high-performance PowerPC RISC microprocessor, a very flexible system integration unit, and multiple communication peripheral controllers. The latter are configured as Ethernet interfaces for communication with the cable system Head End.

The MPC8260 includes an EC603e, an embedded variant of the PowerPC 603e microprocessor having no floating-point processor. The EC603e includes 16 KB of level-one instruction cache and 16 KB of level-one data cache. Software running on the EC603e implements the following functions: ranging; registration; UCD message generation UCC, BPKM, and DSx protocol processing; and MAP message generation.

The MPC8260 further includes an integrated communications processor module (CPM), which is an embedded 32-bit processor using a RISC architecture to support several communication peripherals. The CPM interfaces to the PowerPC core through an on-chip 24 Kbyte dual-port RAM and DMA controller. Using a separate bus, the CPM does not affect the performance of the PowerPC core. The CPM handles the lower MAC layer tasks and DMA control activities, leaving the PowerPC core free to handle higher MAC layer and ASIC related MAC activities. More specifically, the CPM implements the following functions: downstream/upstream Classifier, PHS, traffic shaping, forwarding and filtering. The CPM contains three fast communication controllers (FCCs), each including support for a 10/100-Mbit Ethernet/IEE 802.3 CDMS/CS interface through a media independent interface. Two 100 Mbps Ethernet interfaces are implemented in this manner, for the packet communications with the cable system Head End.

The MPC8260 further includes a system interface unit (SIU), which includes a flexible memory controller usable with many memory system types (e.g. DRAM, FPDRAM, SDRAM, etc . . . ), a 60× bus, a programmable local bus, and the on chip communications processor module. In an illustrative embodiment, PC66 SDRAM is used for the main memory. There are three memory types used in the illustrative embodiment. As shown in FIG. 3C, a 4 MB SDRAM is attached as local RAM, between 16 and 64 MB of SDRAM is attached to the multi-master 60× bus as shared RAM, and between 8 and 32 MB of Flash memory is coupled (via buffers) to the multi-master 60× bus, as shared NV Memory. The 4 MB SDRAM operates at 66 MHz, is 32-bits wide, and is intended for use exclusively by the CPM to buffer descriptors for the communication channels or raw data that is transmitted between channels. The 16-64 MB SDRAM operates at 66 MHz, is 64-bits wide, and is intended for use by either the EC603e or bus mastered accesses by the DSP Multi-Channel Transceiver ASIC. The 8-32 MB Flash includes storage for the operating system and applications. All memory is soldered down to the supporting PCB to improve reliability.

In an illustrative embodiment, a front-side bus, level two, FSB L2) cache is used in conjunction with the MPC8260. An MPC2605 integrated secondary cache device is used. The MPC2605 is a single chip, 256 KB integrated look-aside cache with copy-back capability. The MPC2605 integrated data, tag, and host interface uses memory with a cache controller to provide a 256 KB level 2 cache. At 66 MHz, the MPC2605 supports zero wait state performance and 2-1-1-1 burst transfers. Without the optional cache, an auxiliary PowerPC processor may be necessary to provide the needed computational capability of the MAC functions.

The interface between the MAC Processor and the DSP Multi-Channel Transceiver ASIC is the 60× bus. This bus interface supports 66 MHz operation, 64-hit wide data path, burst transfers and bus mastering arbitration. The MPC8260 is configured for "60× compatible mode" and not "Single bus mode". Configured in this mode, the MPC8260 can support one or more bus masters and the level-two cache. The 60× bus is used in pipeline mode for increased performance, requiring some additional external logic.

Optical Network and Ethernet Interface.

FIG. 3A and FIG. 3C are relevant to the following discussion of the Optical-to-Electrical (O/E) interface. The CPM of the MPC8260 couples to the O/E interface via an LX970A (a product of Level One, Inc.). The LX970A is a 10/100 Mbps Fast Ethernet PHY Transceiver that provides a Media Independent Interface (MII) for attachment to the CPM and a pseudo-ECL interface for use with 100BASE-FX fiber modules to the Head End fiber interface. As shown in FIG. 3A, three fibers provide connectivity between the eFN and the SH (and/or Head End). Each fiber carries up to several wavelengths corresponding to various downstream channels or upstream bursts from multiple eFNs.

Other Features of the Mini-CMTS

In an illustrative embodiment the following features further characterize the eFN's mini-CMTS a) fully digital downstream implementations of Annex B coding and modulation;

b) fully digital upstream implementation of DOCSIS modulated upstream channels, including direct IF sampling, digital baseband conversion, and parallel demodulation of at least 2 channels;

c) parallel digitization of 2 frequency bands containing at least 2 legacy packetized digital return channels (PDC);

d) frequency agility in the total upstream band;

e) fully flexible receiver to allow performance optimization vs. noise and intersymbol interference (all DOCSIS channel parameters, burst profiles & user profiles), with features including variable symbol rate, variable burst length, Reed-Solomon decoding with variable error correction capability and variable code rate, and both QPSK & 16-QAM demodulation (with extensions to 32- & 64-QAM); and f) accurate power, timing & carrier offset estimation.

In preferred embodiments, the eFN's mini-CMTS is further compatible with and supports the following cable-modem features:

a) fully digital, non-data aided symbol clock recovery;
b) joint blind and decision-directed channel equalization;
c) fully digital carrier phase/frequency recovery;
d) fast and aliasing free frame lock technique;
e) transform based area/timing efficient extended Reed-Solomon decoder;
f) single cycle Galois field arithmetic elements (inverters, multipliers, adders/subtractors);
g) digital carrier synthesis supporting on-the-fly frequency selection;
h) variable rate interpolator supporting multiple upstream symbol rates; and
i) adjustable transmit level and local time reference.

System Environment

Figure 7B:
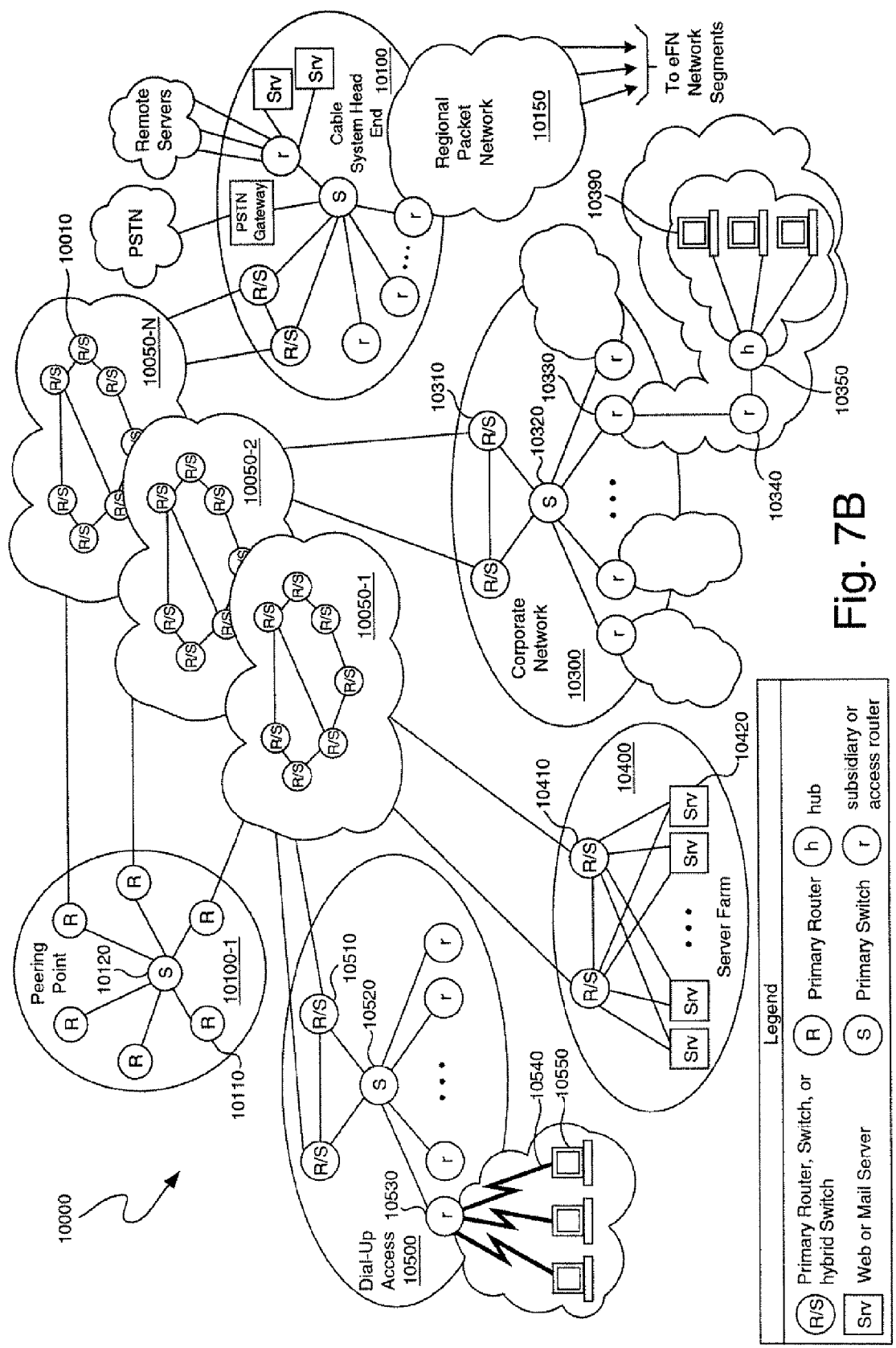
Figure 7C:
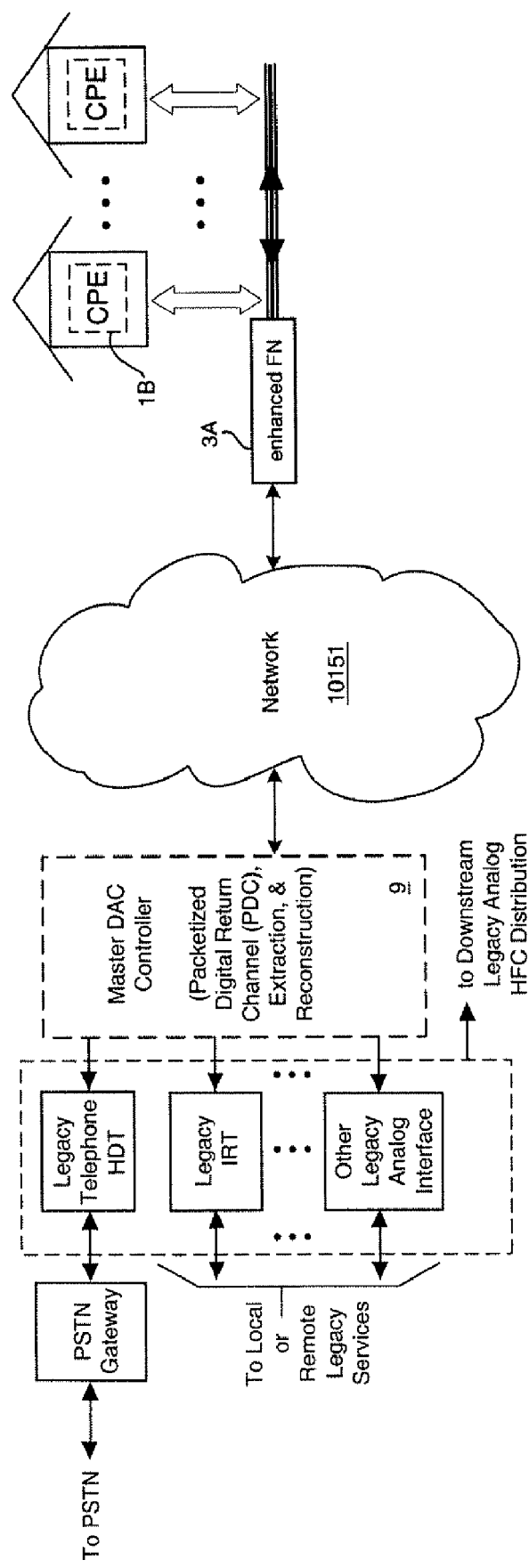
FIG. 7C is a view that focuses on the relationship between the eFN and the Master DAC Controller.
Figure 8:
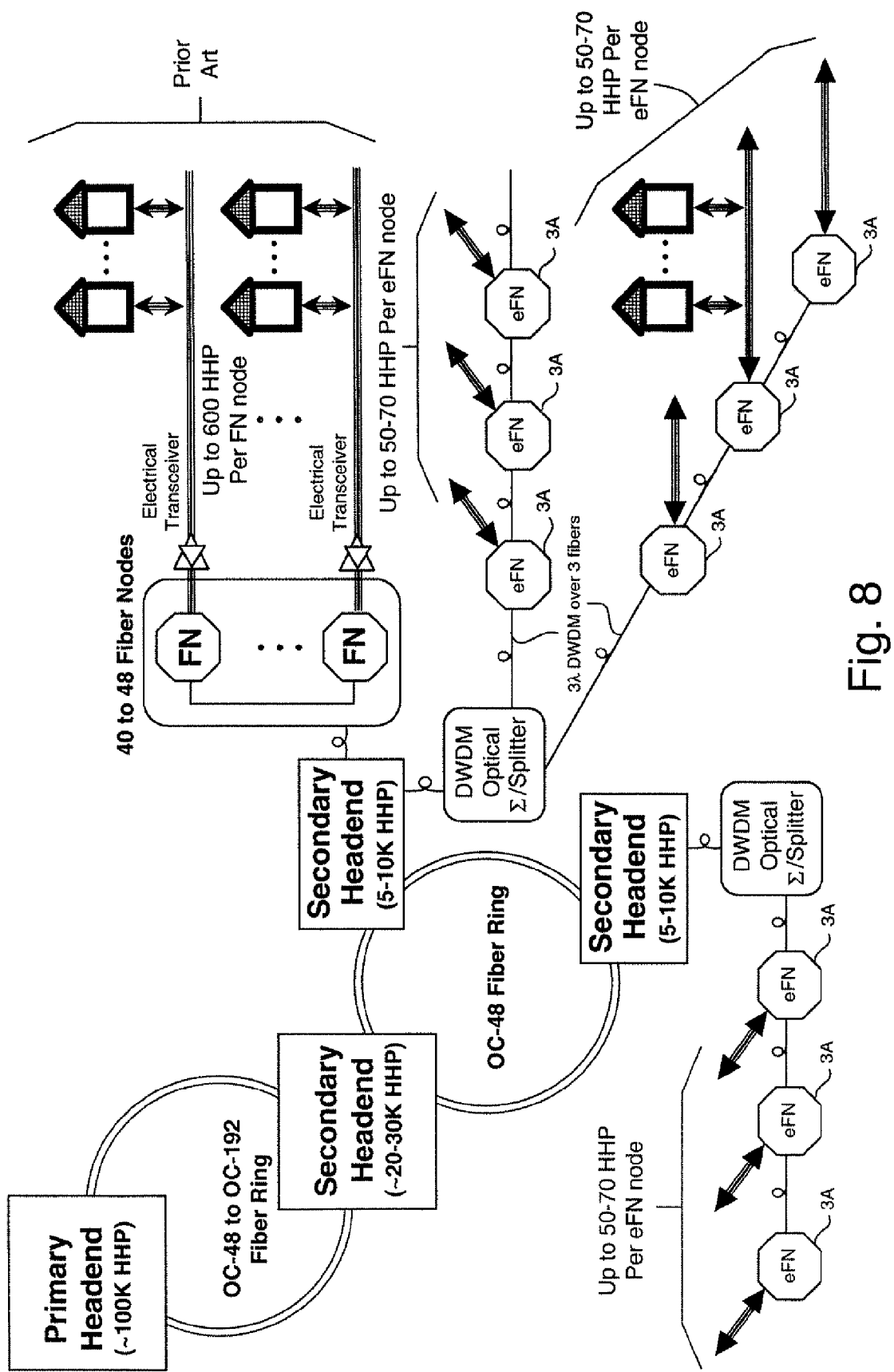
FIG. 8 illustrates an alternate embodiment for an HFC cable system having a packet fiber overlay using eFNs, in accordance with the present invention.

FIGS. 7A and 7B illustrate the system environment for an HFC cable system having a packet fiber overlay using eFNs, in accordance with the present invention. FIG. 7A is a view that focuses on the relationship between the head-end and the customer premises. FIG. 7B is a view that focuses on the relationship between the cable-system head-end and other networks. FIG. 8 illustrates an alternate embodiment for an HFC cable system having a packet fiber overlay using eFNs, in accordance with the present invention.

Logical Allocation of Upstream Channels

An upstream channel can be logically allocated to any of the four available selectable upstream channels per digitized input. One approach to avoiding physical node recombining, where capacity growth is expected, is to initially turn on only one upstream channel per digitized input. If the initial channel reaches capacity, then another channel can be provisioned using the dynamic channel allocation capabilities of the mini-CMTS.

This ability to logically assign channels has a number of benefits. There is no need to purchase a CMTS line card, chassis, or channel bank every time an upstream port reaches capacity. Headend technician time is not lost installing new hardware, disconnecting and reconnecting cables, and reconfiguring the system. Misconfigurations or service disruptions common to physical recombining are avoided. Recombining instead is an operation that can be performed both remotely and online. Finally, channels can be dynamically assigned for specific services or functions, such as migration between different revisions of cable modem standards.

Dynamic Channel Allocation

In addition to the benefits of reducing installation labor and avoiding physical node recombining, dynamic channel allocation also provides a solution to ingress noise, which can vary both in time and channels affected. In conjunction with real time spectral analysis of the entire return spectrum and continuous feedback monitoring of customer quality of service (QoS) levels, the mini-CMTS can quickly detect a problem and take a variety of actions.

Specific actions that the mini-CMTS can take in response to a detected problem include: scanning the entire return spectrum in real time to analyze the environment and find "clean" spectrum; resize the affected channel; dynamically increase or decrease bandwidth; move the channel to a new carrier frequency; allocate and additional channel; move one or all cable modems from one channel to another without registering. Because the modems can be dynamically switched without having to re-register, the integrity of service level agreements are preserved for mission-critical services such as VoIP calls and symmetrical business services.

Reconstruction of Legacy Upstream Channels at the Head End

In order to assure proper demodulation of the legacy return signals, it is necessary to reconstruct each upstream signal precisely at its original carrier frequency. FIG. 10 provides detail of this process. The context for these functional blocks includes FIG. 9 and FIG. 7A.

Reconstruction of the original signal requires performing steps that are the reverse of the sampling and decimation process performed in the mini-CMTS of the eFN. Based on information either known in advance (e.g., the decimation ratio provisioned for the channel) or included in the Ethernet encapsulated frames (the eID, CID, CTRL and SEQ parameters; describing the upstream signal origin, BW and frequency), it is straightforward to reconstruct and upsample to generate an exact replica of the digitized sample stream provided to the front-end of the eFN's mini-CMTS.

These samples are fed into a D/A converter whose clock is running synchronously to the A/D converter in the eFN. The reconstructed signal is thus placed precisely on the proper carrier frequency. The required clock synchronicity can by achieved by a number of means, including e.g. FIFO fullness control and timestamp messaging. The particular method of clock synchronicity is determined at least in part by the degree of short-term absolute frequency precision required by the legacy demodulator/receiver equipment.

FIG. 9 and FIG. 7A provide additional detail showing how multiple instances of the Return Channel Reconstruction logic 10 are implemented within the Master DAC Controller 9, at the Head End. The Master DAC Controller 9 provides extraction and reconstruction of each packetized digital return channel (PDC). Each legacy signal is reconstructed independently and delivered to a corresponding receiver. It is also possible to combine several analog reconstructed signals for delivery over a single coaxial cable to a common legacy demodulator/receiver.

End-to-End Operation of the Packetized Digital Return Channel (PDC)

In conjunction with the A/D(s) 9010 and front-ends 6000, a Legacy Digitizing Framer and Return DSP 15 (located inside each of multiple mini-CMTSs) isolates digitized return channels specified by the Master DAC Controller 9 (located at a cable Head End or SH), encapsulates the associated bit stream into Ethernet packets, and transmits the packets over the regional packet network. (The digitization and packet encapsulation formats are described below.) These packets are forwarded to the distribution hubs and Head End. Since these packets are encapsulated using an Ethernet frame format, standard switches (and routers) can be used to aggregate and relay the traffic.

At the Head End, the Master DAC Controller 9 extracts the bit streams from the Ethernet frames and recovers the analog channels. The Master DAC Controller 9 also controls and monitors the Legacy Digitizing Framer and Return DSP 15 within each of multiple remote eFNs. In an illustrative embodiment, the Master DAC Controller 9 can control up to 216 Digitizing Framers.

Each framer is assigned an IP address and a 16-bit unique identifier (eFN Station ID). The Master DAC Controller 9 communicates with the framers via SNMP. At initialization, the Master DAC Controller configures the framer to select different channels. In an illustrative embodiment, each Legacy Digitizing Framer and Return DSP 15 is capable of supporting four analog channels. The channels can be configured independently. However, these channels should not overlap in frequency. The Characteristics of each Packetized Digital Return Channel (PDC) are given in Table 5, below.

TABLE 5

Channel Characteristics

| Characteristic | Definition |
|---|---|
| Channel ID | a unique 16-bit identifier specifying the channel |
| Frequency | the center frequency of the channel, in Hertz |
| Width | the bandwidth of the channel, in Hertz |
| Frame Length | number of data bytes in each frame |
| Resolution | number of bits per analog sample |

Each frame/packet is uniquely identified by the fields shown in Table 6, below.

TABLE 6

Frame Field Definitions

| Field | Length | Description |
|---|---|---|
| eID (or IP addr) | 16 bits | eFN Station ID |
| CID | 8 bits | Channel ID |
| CTRL | 8 bits | Control |
| SEQ | 16 bits | Sequence Number |

Data Encapsulation for the Packetized Digital Return Channel

Within the eFN's mini-CMTS, the selected analog channels are digitized into streams of bits. These bits are encapsulated into frames. In an illustrative embodiment, the Digitizing Framer provides both a Layer 2 encapsulation mode and a Layer 3 encapsulation mode.

Since Layer 2 frames carry only LAN address information, only switches and transparent bridges can forward them. Therefore, regular IP routers cannot be used to forward the Layer 2 frames at the distribution hubs and Head End, as these frames do not have any IP information. The advantage of using Layer 2 encapsulation is bandwidth efficiency. Since the frames do not have any IP/UDP headers, the framing is very efficient especially for short packets. The amount of overhead per frame is 26 bytes (Ethernet)+6 bytes (PDC)=32 bytes.

Since Layer 3 frames are encapsulated in UDP packets, they are forwarded and routed using standard switches and routers. This would allow the Master DAC Controller to be located at different IP subnets. With Layer 3 encapsulation, the amount of overhead per frame is 26 bytes (Ethernet)+20 bytes (IP)+8 bytes (UDP)=54 bytes.

Layer 2 Encapsulation

Implementation of a "best efforts" upstream data channel using point-to-point layer 2 protocol is summarized as follows. The 5-42 MHz US spectrum is digitized, filtered and decimated to provide a data stream corresponding to the desired channel. The data stream is packetized in Ethernet frames and transmitted using layer 2 protocol to the Master DAC controller 9 (located in the Head End). Each frame is identified by eFN-ID, channel-ID and Payload control (using SA and DA). The Master DAC Controller 9 will reconstruct the original legacy signal(s) at the Head End (with the original frequency and bandwidth). The Master DAC Controller 9 will provide the resulting legacy flows to legacy equipment for subsequent demodulation. Also using layer 2 protocol over the downstream path, the Master DAC Controller 9 sends control commands to specific eFNs as required to implement provisioning and configuration of each eFN's mini-CMTS.

With Layer 2 encapsulation, the bit streams are encapsulated into Ethernet frames as shown in FIG. 5. The source address and destination address of the frames are the hardware addresses of the Digitized Framer and Master Controller, respectively. A Packetized Digital Return Channel (PDC) header is inserted to uniquely identify each frame. The PDC header includes four fields: eID is the eFN Station ID of the associated Framer, CID is the Channel ID of the analog channel and CTRL contains control bits and reserved bits. SEQ is the byte sequence number and identifies the byte in the stream of data from the Framer to the Master Controller that the first byte of data in this frame represents.

Layer 3 Encapsulation

Implementation of a "best efforts" upstream data channel using a point-to-point UDP/layer 3 protocol is summarized as follows. The 5-42 MHz US spectrum is digitized, filtered and decimated to provide a data stream corresponding to the desired channel. The data stream is encapsulated in UDP packets and transmitted using layer 3 protocol to the Master DAC controller 9 (located in the Head End). Each frame is identified using the source port number (eFN-ID, channel-ID and Payload control). The Master DAC Controller 9 will reconstruct the original legacy signal(s) at the Head End (with the original frequency and bandwidth). The Master DAC Controller 9 will provide the resulting legacy flows to legacy equipment for subsequent demodulation. Using TCP, the Master DAC Controller 9 also sends control commands from the Head End Management System (HMS) to specific source port numbers in order to implement provisioning and configuration of each eFN's mini-CMTS.

With Layer 3 encapsulation, the bit streams are encapsulated in UDP packets as shown in FIG. 6. In the IP header, the source IP address and the destination IP address are the IP addresses of the transmitting framer and the Master Controller, respectively. The source UDP port number (SP) is used to represent CID and CTRL while the default destination UDP port number is 3103. Since the packet size is constant (set by SNP), the UDP packet length field is used to represent the SEQ field.

Control and Monitoring of Legacy Digitizing Framer

The parameters for each channel's framer are configured via SNMP. The attributes for each analog channel are detailed in Table 7, below.

TABLE 7

Channel Table MIB

| MIB | Access | Syntax | Description |
|---|---|---|---|
| Channel Id | RW | Integer32 (0 . . . 255) | Identifier of this channel |

TABLE 7-continued

Channel Table MIB

| MIB | Access | Syntax | Description |
|---|---|---|---|
| Frequency | RW | Integer32 (0 ... 1 000 000 000) | Center frequency of this channel in Hertz |
| Width | RW | Integer32 (0 ... 10 000 000) | Bandwidth of this channel in Hertz |
| Power | RO | Integer32 | Received Power in tenth of dBmV |
| Length | RW | Integer32 (64 ... 1518) | Length of Packets in Bytes |
| Resolution | RW | Integer32 (8 ... 12) | Number of Bits per analog sample |

Since SNMP is a best effort delivery protocol, the Master DAC controller is responsible for guarantying the retrieval of the setting of the channel attributes. An ARQ approach is used to ensure the framers are configured with the correct setting:

```
While (true) {
    Configure the Framer using SNMP SET
    Read the configuration of the Framer via SNMP GET
    If (Correct setting)
        Break
    Wait a few seconds
}
```

In the above approach, the DAC controller would repeatedly transmit SNMP SET commands until the corresponding channel is set up correctly.

CONCLUSION

Although the present invention has been described using particular illustrative embodiments, it will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications (such as the frequency ranges for upstream signals; the content type, modulation and encoding schemes of the upstream signals; the type of microprocessor utilized), are merely those of the illustrative or preferred embodiments, can be expected to track improvements and changes in implementation technology, and should not be construed as limitations of the invention.

Functionally equivalent techniques known to those skilled in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

All such variations in design comprise insubstantial changes over the teachings conveyed by the illustrative embodiments. The names given to interconnect and logic are illustrative, and should not be construed as limiting the invention. It is also understood that the invention has broad applicability to other communications applications over distributed networks, and is not limited to the particular application or industry of the illustrated embodiments. The present invention is thus to be construed as including all possible modifications and variations encompassed within the scope of the appended claims.

We claim:

1. A fiber node in a hybrid fiber-coax network (HFCN) located between an upstream facility and a plurality of cable modems, comprising:
   a cable modem termination system (CMTS) comprising:
      a transmitter to transmit data to the cable modems as downstream analog radio frequency (RF) signals over a plurality of downstream channels,
      a receiver to receive upstream analog RF signals from the cable modems over a plurality of upstream channels and extract data from the upstream analog RF signals, and
      a processor, connected to the transmitter and the receiver, to:
         provide the data to the transmitter,
         receive the extracted data from the receiver and send the extracted data to the upstream facility,
         dynamically allocate a downstream channel of the plurality of downstream channels to a downstream network path for transmitting the data or an upstream channel of the plurality of upstream channels to an upstream network path for receiving the data by compressing, merging, and packet transmitting data over the downstream network path or the upstream network path,
         isolate multiple ones of the upstream channels, less than all of the upstream channels, and
         combine the extracted data from the isolated upstream channels for digital transmission to the upstream facility, where at least one of the isolated upstream channels is unrelated in function or frequency to at least one other isolated upstream channel.

2. The fiber node of claim 1, where the transmitter includes a plurality of modulators, where each of the modulators corresponds to one of the plurality of downstream channels.

3. The fiber node of claim 1, where the receiver includes a plurality of demodulators, where each of the demodulators corresponds to one of the plurality of upstream channels.

4. The fiber node of claim 1, where the CMTS is to communicate with the upstream facility via a packet network.

5. The fiber node of claim 1, where the CMTS is to communicate data and control signals with the upstream facility via an Ethernet-compatible packet network.

6. The fiber node of claim 1, where the processor is to compress and merge the extracted data from multiple ones of the cable modems before sending the extracted data to the upstream facility.

7. The fiber node of claim 1, where the CMTS is to send data associated with one of the upstream channels to the upstream facility without extracting the data associated with the one upstream channel.

8. The fiber node of claim 7, where the CMTS is to transmit the data associated with the one upstream channel via a tunnel to the upstream facility.

9. The fiber node of claim 1, where the upstream facility includes an upstream hub or an upstream head end.

10. The fiber node of claim 1, where the CMTS is to determine that there is a problem associated with one of the upstream channels or one of the downstream channels.

11. The fiber node of claim 10, where the CMTS is further to scan a spectrum associated with the one upstream channel or the one downstream channel in real time to identify a part of the spectrum that is free of the problem.

12. The fiber node of claim 10, where the CMTS is further to resize the one upstream channel or the one downstream channel based on determining the problem.

13. The fiber node of claim 10, where the CMTS is further to dynamically increase or decrease bandwidth associated with the one upstream channel or the one downstream channel based on determining the problem.

14. The fiber node of claim 10, where the CMTS is further to move the one upstream channel or the one downstream channel to a new frequency based on determining the problem.

15. The fiber node of claim 10, where the CMTS is further to allocate an additional upstream channel or an additional downstream channel based on determining the problem.

16. The fiber node of claim 10, where the CMTS is further to move one or more of the cable modems associated with the one upstream channel or the one downstream channel to another one of the upstream channels or another one of the downstream channels without registering the moved one or more cable modems based on determining the problem.

17. A fiber node in a hybrid fiber-coax network (HFCN) located between an upstream facility and a plurality of cable modems, comprising:
   a cable modem termination system (CMTS) comprising:
      means for transmitting data to the cable modems as downstream analog radio frequency (RF) signals over a plurality of downstream channels,
      means for receiving upstream analog RF signals from the cable modems over a plurality of upstream channels and extracting data from the upstream analog RF signals,
      means for dynamically allocating a downstream channel of the plurality of downstream channels to a downstream network path for transmitting the data or an upstream channel of the plurality of upstream channels to an upstream network path for receiving the data by compressing, merging, and packet transmitting data over the downstream network path or the upstream network path,
      means for isolating multiple ones of the upstream channels, a number of the isolated upstream channels being less than all of the upstream channels, and
      means for combining the extracted data from the isolated upstream channels for digital transmission to the upstream facility, where at least one of the isolated upstream channels is unrelated in function or frequency to at least one other one of the isolated upstream channels.

18. The fiber node of claim 17, where the means for transmitting data includes a plurality of modulators, where each of the modulators corresponds to one of the downstream channels.

19. The fiber node of claim 17, where the means for receiving upstream analog RF signals includes a plurality of demodulators, where each of the demodulators corresponds to one of the upstream channels.

20. The fiber node of claim 17, where the CMTS further comprises means for communicating with the upstream facility via a packet network.

21. The fiber node of claim 17, where the CMTS further comprises means for communicating data and control signals with the upstream facility via an Ethernet-compatible packet network.

22. The fiber node of claim 17, where the CMTS further comprises means for sending data associated with one of the upstream channels to the upstream facility without extracting the data associated with the one upstream channel.

23. The fiber node of claim 22, where the means for sending data associated with one of the upstream channels comprises means for transmitting the data associated with the one upstream channel via a tunnel to the upstream facility.

24. The fiber node of claim 17, where the upstream facility includes an upstream hub or an upstream head end.

25. The fiber node of claim 17, where the CMTS further comprises means for determining that there is a problem associated with one of the upstream channels or one of the downstream channels.

26. The fiber node of claim 25, where the CMTS further comprises means for scanning a spectrum associated with the one upstream channel or the one downstream channel in real time to identify a part of the spectrum that is free of the problem.

27. The fiber node of claim 25, where the CMTS further comprises means for resizing the one upstream channel or the one downstream channel based on determining the problem.

28. The fiber node of claim 25, where the CMTS further comprises means for dynamically increasing or decreasing bandwidth associated with the one upstream channel or the one downstream channel based on determining the problem.

29. The fiber node of claim 25, where the CMTS further comprises means for moving the one upstream channel or the one downstream channel to a new frequency based on determining the problem.

30. The fiber node of claim 25, where the CMTS further comprises means for allocating an additional upstream channel or an additional downstream channel based on determining the problem.

31. The fiber node of claim 25, where the CMTS further comprises means for moving one or more of the cable modems associated with the one upstream channel or the one downstream channel to another one of the upstream channels or another one of the downstream channels without registering the moved one or more cable modems based on determining the problem.

32. A hybrid fiber-coax network, comprising:
   a cable system head end; and
   a plurality of fiber nodes connected between a plurality of cable modems and the cable system head end, at least one of the fiber nodes comprising:
      a transmitter to transmit data to the plurality of cable modems over a plurality of downstream channels,
      a receiver to receive upstream signals from the plurality of cable modems over a plurality of upstream channels and extract data from the upstream signals, and
      a processor, connected to the transmitter and the receiver, to:
         provide the data to the transmitter,
         receive the extracted data from the receiver and send the extracted data to the cable system head end,
         dynamically assign or configure a downstream channel of the plurality of downstream channels to a downstream network path for transmitting the data or an upstream channel of the plurality of upstream channels to an upstream network path for receiving the data by compressing, merging, and packet transmitting data over the downstream network path or the upstream network path, isolate multiple ones of the upstream channels, less than all of the upstream channels, and combine the extracted data from the isolated upstream channels for digital transmission to the upstream facility, where at least one of the isolated upstream channels is unrelated in function or frequency to at least one other isolated upstream channel.

* * * * *